United States Patent [19]

Sato

[11] E Patent Number: Re. 31,701

[45] Reissued Date of Patent: Oct. 9, 1984

[54] PORTABLE LABEL PRINTING AND APPLYING MACHINE

[75] Inventor: Yo Sato, Tokyo, Japan

[73] Assignee: Kabushiki Kaisha Sato Kenkyusho, Japan

[21] Appl. No.: 400,160

[22] Filed: Jul. 20, 1982

Related U.S. Patent Documents

Reissue of:

[64] Patent No.: 4,113,544
Issued: Sep. 12, 1978
Appl. No.: 750,845
Filed: Dec. 15, 1976

[30] Foreign Application Priority Data

Dec. 20, 1975 [JP] Japan ..... 50-151235
Dec. 31, 1975 [JP] Japan ..... 50-158620

[51] Int. Cl.[3] ..... B41F 1/08; B41F 1/44; B41F 1/38

[52] U.S. Cl. ..... 156/384; 101/288; 101/292

[58] Field of Search ..... 156/384, 577, 579, 584; 101/287, 288, 291, 292, 316

[56] References Cited

U.S. PATENT DOCUMENTS 3,408,931 11/1968 Austin .
3,490,365 1/1970 Roche .
3,911,817 10/1975 Becker et al. ..... 156/384
4,057,452 11/1977 Sato ..... 156/384

*Primary Examiner*—Caleb Weston
*Attorney, Agent, or Firm*—Ostrolenk, Faber, Gerb & Soffen

[57] ABSTRACT

A portable label printing and applying machine: a platen to support the label to be printed is attached to the machine frame; a printing head is placed above the platen; a spring pushes the printing head down toward the platen with a constant pressure and for a constant time period, regardless of the strength and the duration of the squeezing of the operating hand lever of the machine; the printing head is restrained from descending until the spring has been adequately charged by squeezing of the hand lever, and then the printing head is released to descend. The printing head is separated from the platen immediately after its descent to and contact against the platen. In addition, there is a second spring acting on the printing head in opposition to the first mentioned spring to raise the printing head off the platen. In one embodiment, the first spring is apart from the printing head but acts on it. In another embodiment, the printing head is comprised of a number of relatively movable parts; the first spring for moving the head to the platen is in the printing head and is charged by relative motion of the parts of the printing head.

52 Claims, 27 Drawing Figures

110
110a
110b
110c
108
108'
109
109'
111
112
113
115
116
117
118
120
125
134
137
138
a'

PORTABLE LABEL PRINTING AND APPLYING MACHINE

Matter enclosed in heavy brackets [ ] appears in the original patent but forms no part of this reissue specification; matter printed in italics indicates the additions made by reissue.

BACKGROUND OF THE INVENTION AND DESCRIPTION OF THE PRIOR ART

This invention relates to portable label printing and applying machines.

Precise printing cannot always be obtained with such a machine because the printing pressure of the printing head against the label varies with the strength of squeezing of the operating hand lever of the machine. Even when the printing pressure is held constant, precise printing cannot be obtained because the quantity of printing ink that permeates into the label varies when the hand lever is squeezed for a long time or is released in a moment. Therefore, the quantity of ink applied to the label surface always lacks uniformity, which results in indistinct and unsatisfactory printing on labels.

For example, in the portable label printing and applying machine disclosed in Japanese Patent Publication No. Sho. 40-12335 (1965), a hand lever is pivotally secured to the grip that is integrally formed on the rear part of the machine frame. The hand lever is provided with a yoke, and a printing head is firmly attached to the front end of the yoke, without using any shock absorbing device. When the hand lever is operated, the interlocked printing head is vertically moved together with the yoke. With such a structure, neither the printing pressure nor the duration of a printing is constant.

In the portable label printing and applying machine disclosed in Japanese Patent Publication No. Sho. 47-12506 (1972), a hand lever is pivotally secured to the grip that is integrally formed on the lower part of the machine frame. The upper extension of the hand lever forms a cam to which an ink roller is rotatably attached, and a printing head is fixed to an arm that is pivotally attached to the machine frame. The printing head is urged toward a label supporting platen by means of the tension of a spring. When the hand lever is squeezed, the printing head support arm is pushed up by the cam of the hand lever. At the same time, the type faces of the printing head have ink applied to them by the ink roller. When the hand lever is then released, the printing head is automatically lowered by spring action to print labels on the platen. With this mechanism, regardless of the strength with which the hand lever is squeezed, the labels are printed with a constant printing pressure by the action of the spring. However, the type faces of the printing head remain in contact with the label after the printing stroke, so that the quantity of ink transferred to a label varies according to the duration of such contact.

As described above, the performances of known label printing and applying machines are liable to vary during every operation of the hand lever so that the clarity of each printed label is different. Such irregularly printed labels have been acceptable because they only have been read by the naked eyes of the customers and the cashiers totaling the sales. Recently, the figures, symbols (bar codes, OCR letters) printed on labels are being read by computerized optical readers which are part of POS (point of sales) systems. In POS systems, information on stocks, sales, kinds of customers for various commodities, profits, and other working data are scanned, memorized and processed by electronic computers. Therefore, it is necessary to print labels always with clear, machine readable letters and marks.

Examples of mechanisms which provide constant printing pressure and printing time are shown in U.S. application Ser. No. 723,556, filed Sept. 15, 1976 and U.S. Pat. No. 4,057,452. In both of these, it is the label supporting platen that is moved. However, there are situations where it is the printing head that is to be moved.

BRIEF SUMMARY OF THE INVENTION

The primary object of the present invention is to provide an improved label printing and applying machine which is able to print precise letters and marks on labels.

A further object of the present invention is to provide an improved constant printing pressure mechanism which is built into a portable label printing and applying machine.

Another object of the present invention is to provide a label printing and applying machine in which the type faces of a printing head are brought into contact with labels being printed with constant printing pressure and for a constant contact time.

Yet another object of the present invention is to provide such a machine wherein the strength and duration of a printing stroke by the printing head is controlled by a spring.

It is a still further object of the invention to raise the printing head off the label immediately after the label is printed.

Still a further object of the present invention is to provide a label printing and applying machine which is compact and simple in construction and efficient in operation.

The portable label printing and applying machine of the present invention is of the type in which a label strip is moved forward for one label length and is printed by each squeezing operation of a hand lever. The portable label printing and applying machine includes a platen to support the label strip when it is printed. The platen is immovably secured to the machine frame. A printing head to print the label strip is moved through the space above the platen and is pushed down to the platen as a result of the squeezing of the hand lever through a biasing means that is charged by squeezing of the hand lever and that is discharged by still further squeezing of the lever. The printing head is separated from the platen immediately after the downward movement of the printing head.

In portable label printing and applying machines according to the present invention, no matter whether the hand lever is squeezed strongly or weakly and no matter how long a time the lever is squeezed, a constant printing pressure is exerted by the type faces of the printing head on the surface of the label for a constant short time. Therefore, precise and uniform printing on labels can be attained.

In all embodiments, the printing head is caused to descend to the platen by a spring biasing means that is charged as the grippable lever of the labeler is squeezed, and the printing head is restrained from making its complete printing stroke under the influence of the spring, until the hand lever has charged the printing head spring biasing means. Also, there is a rebound spring biasing means associated with the printing types of the printing head and this spring cooperates with the rebound of the impact of the printing types on the label being printed to separate the printing head from the label. In some of the embodiments, the printing head is in several parts, with one type carrying part biased to the print position under the control of the main biasing spring. That part is also restrained while the yoke is moved, thereby charging the main biasing spring, and that part is later released to knock against the label to be printed. Various print head restraining means and means for releasing this restraint are disclosed. Also, elements of a complete labeling machine, including a label strip cutting device and a cut label applicator, are disclosed.

BRIEF DESCRIPTION OF THE DRAWINGS

In order that the invention may be more fully understood, preferred embodiments thereof are now described with reference to the accompanying drawings, in which.

DETAILED DESCRIPTION OF THE PREFERRED EMBODIMENTS

Referring to the accompanying drawings, three preferred embodiments of the present invention will now be described.

Figure 1:
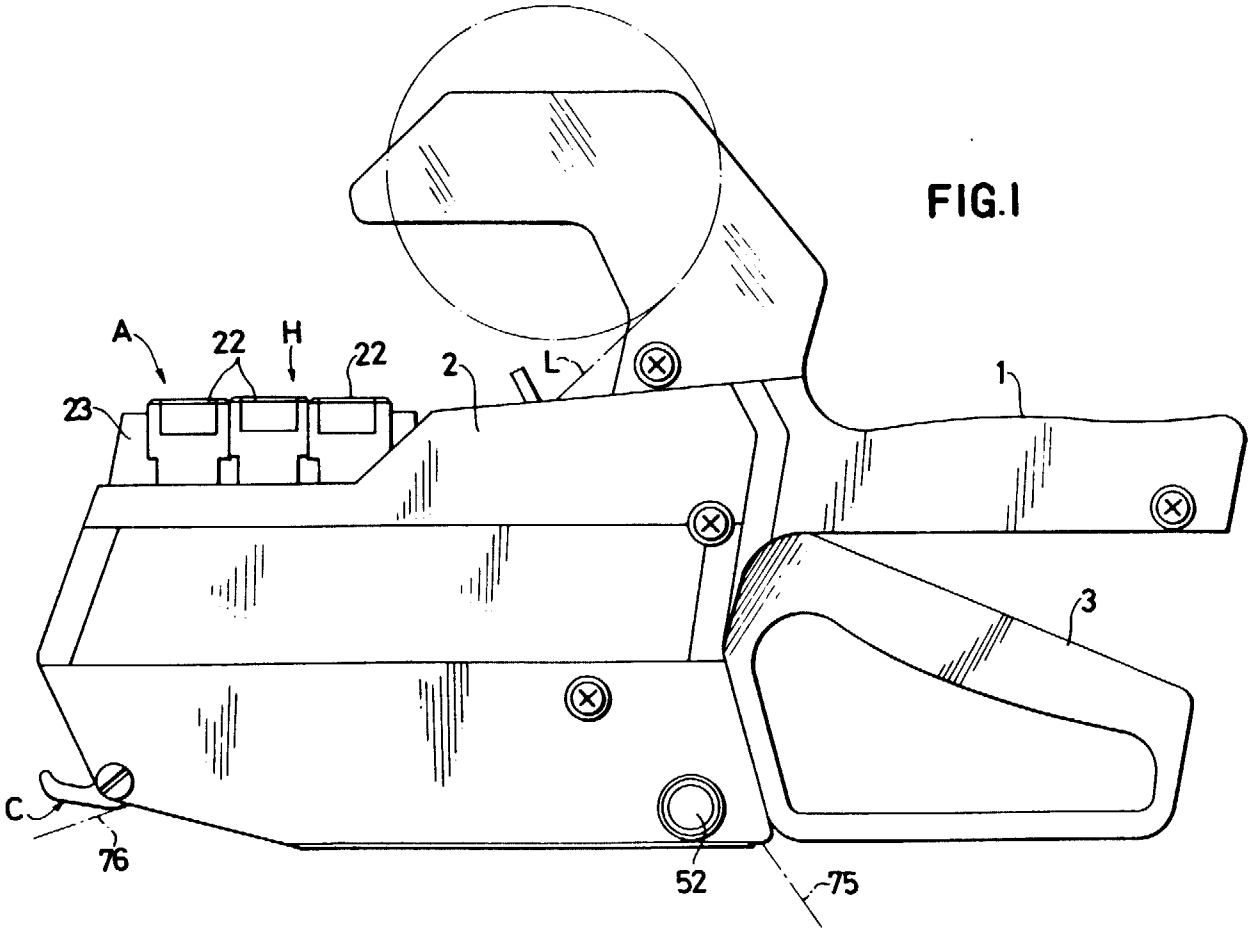
FIG. 1 is a side elevational view of a portable label printing and applying machine that is provided with a first embodiment of the present invention.
Figure 2:
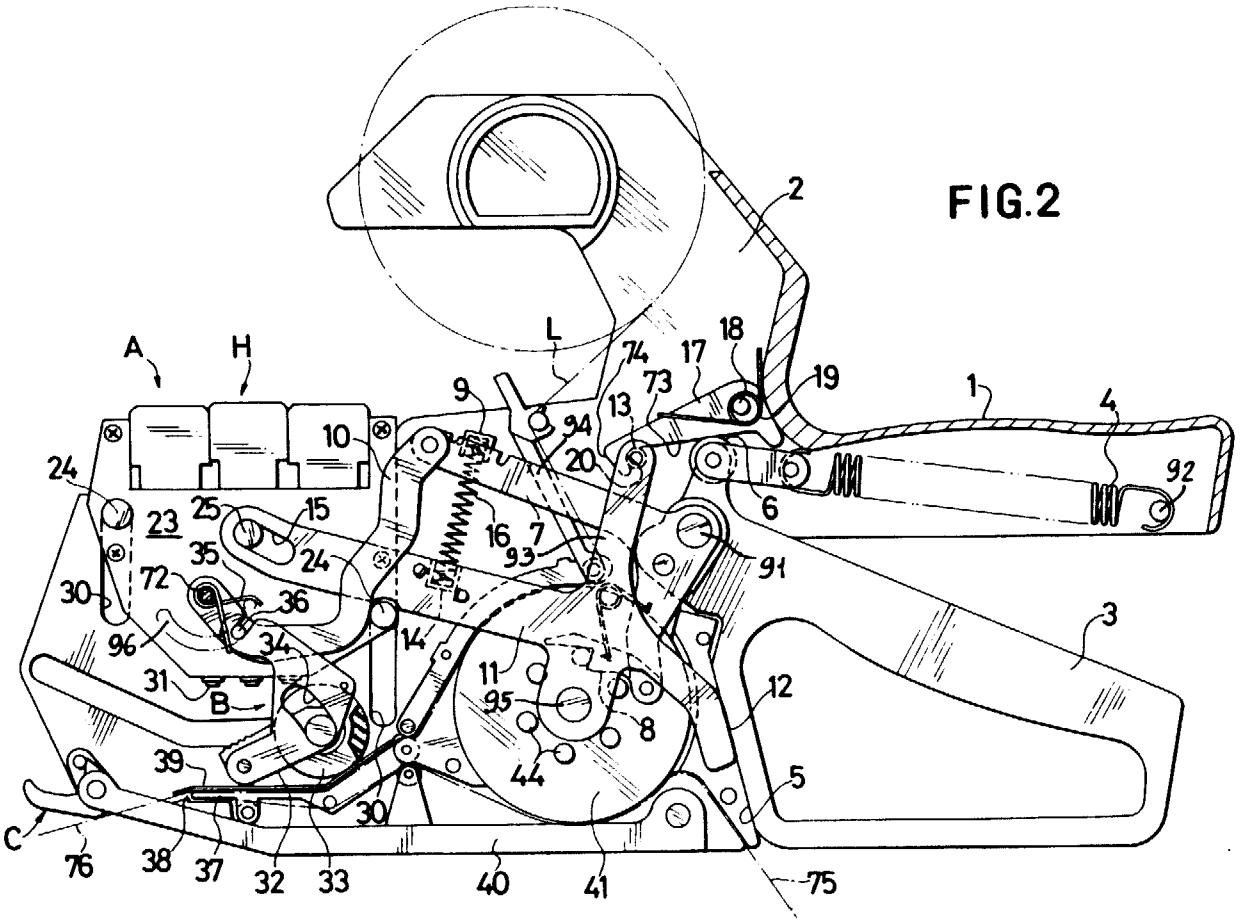
FIG. 2 is a partially cross-sectional side elevational view of the labeler of FIG. 1 in which the machine frame element on the viewing side is removed and the hand lever of the machine is released.
Figure 4:
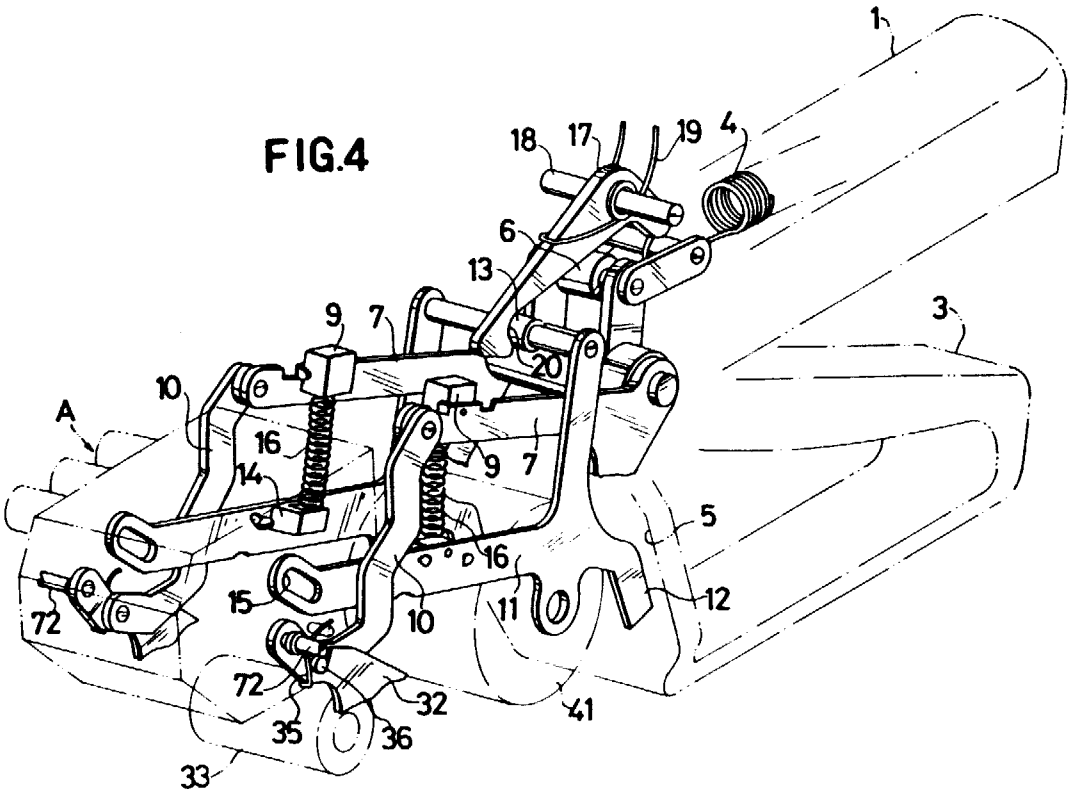
FIG. 4 is a perspective view of the main operating mechanism of the first embodiment of the invention.

As shown in FIGS. 2 and 4, the machine frame 2 of the first embodiment has a stationary hand grip 1 on its rear (right-hand) side. An operating or hand lever 3 is pivotally attached at the rear of the machine frame 2 to the pivot 91 fixed on the frame. The lower front (left-hand) face 5 of the hand lever 3 is urged toward the rear (right-hand) side of the machine frame 2 by a spring 4 connected between the top of lever 3 and a pin 92 fixed in grip 1. The hand lever 3 has a contact roller 6 projecting up from its upper front end. A yoke 7 is attached to and extends forward from the hand lever 3 so as to operate together with the lever. The yoke 7 has a pair of downwardly depending rear arms 93 attached to its rear portion. A pair of label strip advancing hooks 8 are pivotally attached at the respective lower ends of the rear arms 93 of the yoke 7 and these serve as part of the label moving or advancing means. A pair of spring supports 9 are affixed to the respective forwardly projecting front arms 94 of the yoke 7. A pair of driving levers 10 are respectively pivotally secured to the front ends of the arms 94 of the yoke 7.

A pair of generally cross-shaped aligned yoke members 11 are pivotally attached to the machine frame 2 at pivot 95. Each cross-shaped yoke member 11 has a downwardly, rearwardly inclined means or surface 12 formed on the rear side of its rearwardly projecting arm. The surface 12 is adapted to push against the lower front face 5 of the hand lever 3 when the lever 3 is released. The yoke members 11 are provided with a fastening roller 13 at the ends of their legs. There are spring supports 14 on the front legs of yoke members 11 and slots 15 formed in the front end portions of the front legs.

Compression springs 16 extend between the spring supports 9 and 14. When the hand lever 3 is squeezed, yoke 7 is forced down, the springs 16 are compressed and the front legs of the cross-shaped yoke members 11 are urged to move down and counterclockwise around pivot 95.

A restraining means restrains the yoke 7 from descending. That means comprises a pawl 17 attached to the top of the machine frame 2 with a pin 18. The hook 20 at the front end of the pawl 17 is urged down by a spring 19 which urges pawl 17 to pivot counterclockwise. The fastening roller 13 at the end of the leg of members 11 is caught by the hook 20. There is a release means for the above described restraining means. When the hand lever 3 is squeezed, the bottom face 73 of the pawl 17 is lifted up by the engaging means or contact roller 6 at the top of yoke 7 and the hook 20 is disengaged from the fastening roller 13.

Figure 5:
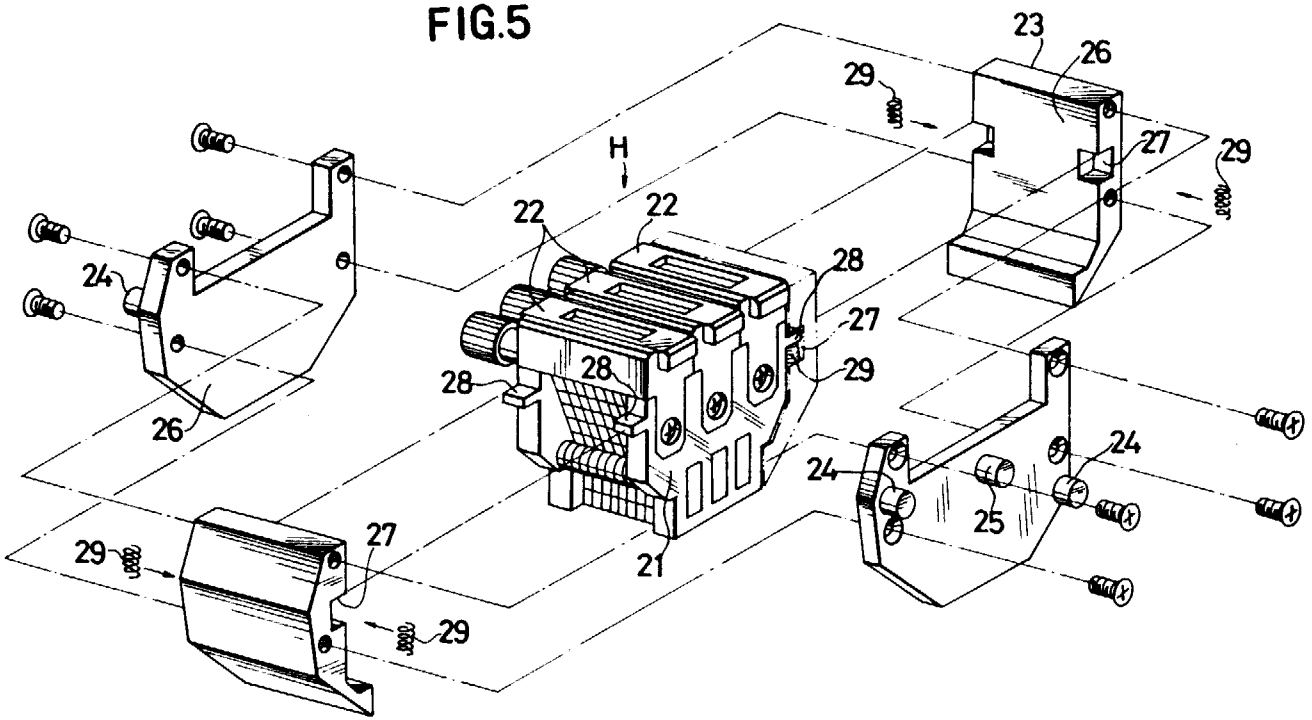
FIG. 5 is a partially exploded perspective view of a printing head used with the first embodiment of the invention.

As shown in FIG. 5, printing head A for printing a series of labels comprises printing devices 22, a printing head frame 21 to hold the printing devices 22, and a casing 23 to carry and vertically guide the frame 21. The outer sides of the casing 23 are provided with guide pins 24 for vertically guiding the printing head A and with a driving pin 25 by which the printing head A is vertically moved.

Figure 3:
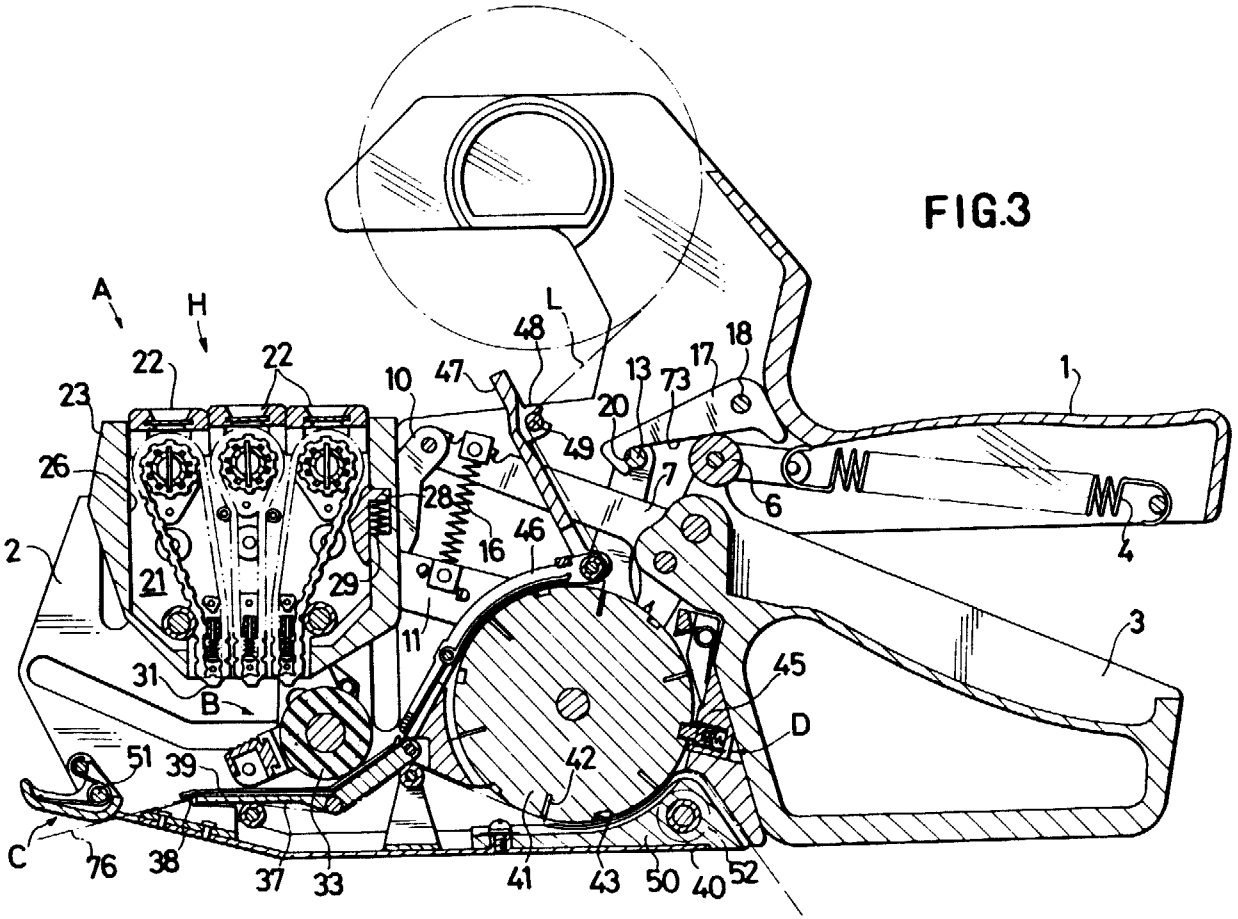
FIG. 3 is another vertical cross-sectional view like that in FIG. 2, but taken on the longitudinal center plane of the machine.

As shown in FIGS. 3 and 5, inwardly facing walls 26 guide the printing head portion H which is formed in the casing 23. The casing 23 can be disassembled into front, rear and both side walls. Recesses 27 are formed in the four corners of and only in the front and rear of the casing 23. The four corners at the front and rear of the printing head portion H are provided with forward and rearward projections 28 which are fitted into the recesses 27 of the casing 23. The recesses 27 are taller than the projections 28. A compression coil spring 29 is placed under each projection 28 in its recess 27 so as to push up the projection and the printing head portion H with respect to the casing 23. Accordingly, the printing head portion H can be lowered relative to the casing 23 through compressing the springs 29.

Turning to FIG. 2, the driving pins 25 outside both sides of the casing 23 are inserted into the slots 15 of the front legs of the cross-shaped yoke members 11. The printing head A can thus be vertically moved by the pivotal movement of the yoke members 11. The guide pins 24 on the printing head casing 23 are fitted into respective vertical grooves 30 that are formed in the inside walls of the machine frame 2. The bottom ends of grooves 30 serve as a second restraint for the printing head casing. When the guide pins 24 are moved down to abut against the lower ends of the respective grooves 30, only the casing 23 is suddenly stopped at the position. The printing head portion H is carried further by its momentum. The projections 28 descend through the recesses 27 and it is during this later descent of the portion H that the label then on the platen 37 is struck and printed.

An inking device B applies ink to the type faces 31 on the underside of the printing head A. The inking device B has rocking levers 32 which are pivotally secured on the pins 72 that project from the inside walls of the machine frame 2. The levers 32 are urged to pivot rearwardly by torsion springs 35. An ink roller 33 is carried by the vertically elongated slots 34 defined in the rocking levers 32.

The rocking levers 32 are pushed forward by the pins 36 that are formed on the front ends of the driving levers 10. The pins 36 ride in the curved, forwardly extending slots 96 formed in the frame 2. Therefore, the ink roller 33 can be moved forward under the printing head A as a result of the squeezing of the hand lever 3 while the ink roller is urged rearwardly by the springs 35.

Beneath the printing head A is a platen 37 that is firmly secured to the machine frame 2. A peeling section 38 is formed at the front portion of the platen 37 for peeling printed labels 76 from the backing paper 75 of a label strip L. The peeling section 38 comprises a narrow space between the upper front surface of a bottom cover 40 of the frame and the extended lower surfaces of guide pieces 39 for guiding the label strip L on the platen 37.

A label applying device C presses each label 76 that has been peeled from the backing paper 75 and fed out of the peeling section against the surface of an article.

The label moving means further comprises a label strip advancing roller 41 coaxially mounted with the yoke members 11 to rotate with respect to the frame 2. As shown in FIG. 3, the advancing roller 41 is provided around its peripheral surface with a plurality of advancing projections 42 that are arranged at regular intervals corresponding to the length of a single label. In between each pair of projections 42, there is a positioning recess 43. Further, as shown in FIG. 2, the advancing roller 41 is provided with indexing pins 44 projecting from both sides. The cuts or perforations (not shown) of the label strip L are engaged by the advancing projections 42. One of the positioning recesses 43 receives the outwardly spring biased projection 45 of a positioning device D. Further, the hook 8 on the yoke 7 engages one of the indexing pins 44. In each squeeze of the hand lever 3, the hook 8 is moved to push an indexing pin 44 forward for one label length to drive the advancing roller 41 intermittently so that the label strip L is advanced for one label length.

The label strip L is guided by a guide member 46 around the advancing roller 41. The front end of the guide member 46 is hingedly connected to the rear end of the platen 37. The rear end of the guide member 46 has an upstanding operation piece 47 extending above it. The piece 47 can be turned about the pin attached at the rear end of the guide member 46. The catch 48 of the operation piece 47 is releasably caught on the frame 2 by a pin 49. When the catch 48 is held by the pin 49, the label strip L is guided on the advancing roller 41. When the label strip L is placed on the machine, the guide member 46 is separated from the advancing roller 41 by releasing the catch 48 from the pin 49 and pulling up the operation piece 47.

Beneath the advancing roller 41, there is another guide member 50 which is attached to the bottom cover 40 of the machine frame so as to guide the peeled backing paper 75. The bottom cover 40 is pivotally supported on the shaft 51 of the label applying device C. When the backing paper 75 is introduced into the space between the advancing roller 41 and the guide member 50, the bottom cover 40 is turned open about the shaft 51 by releasing the lock buttons 52.

The operation of the first embodiment is now described.

After the label strip L is mounted on the machine, the operating or hand lever 3 is in the position shown in FIG. 2. When the lever 3 is squeezed, it moves into the position shown in FIG. 6. The restraining means release means contact roller 6 on the yoke 7 engages the bottom face 73 of the pawl 17 of the restraining means and pushes up the pawl. The yoke 7 is pivoted around pivot 91 to retract the hooks 8 of the label moving means and move the hooks to the left. The yoke 7 compresses the springs 16 and also forces the attached ink roller driving levers 10 down. Descent of the driving levers 10 moves the ink roller 33 forward from the lower rear side of the printing head A to the front portion of the machine frame 2 by the action of the pins 36 on the levers 10.

Figure 6:
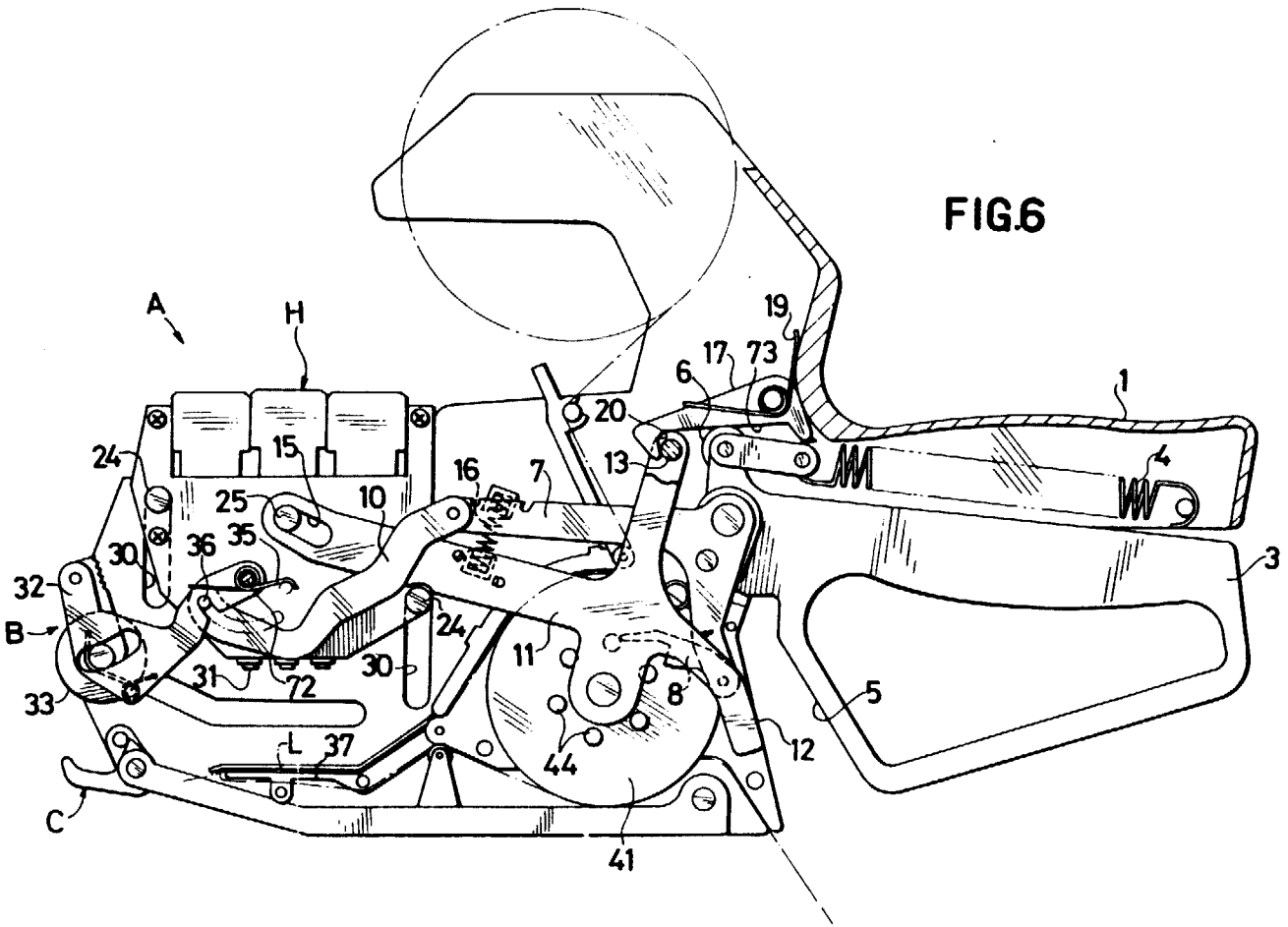
FIG. 6 is the same type of view as FIG. 2, in which the hand lever is partially squeezed.
Figure 7:
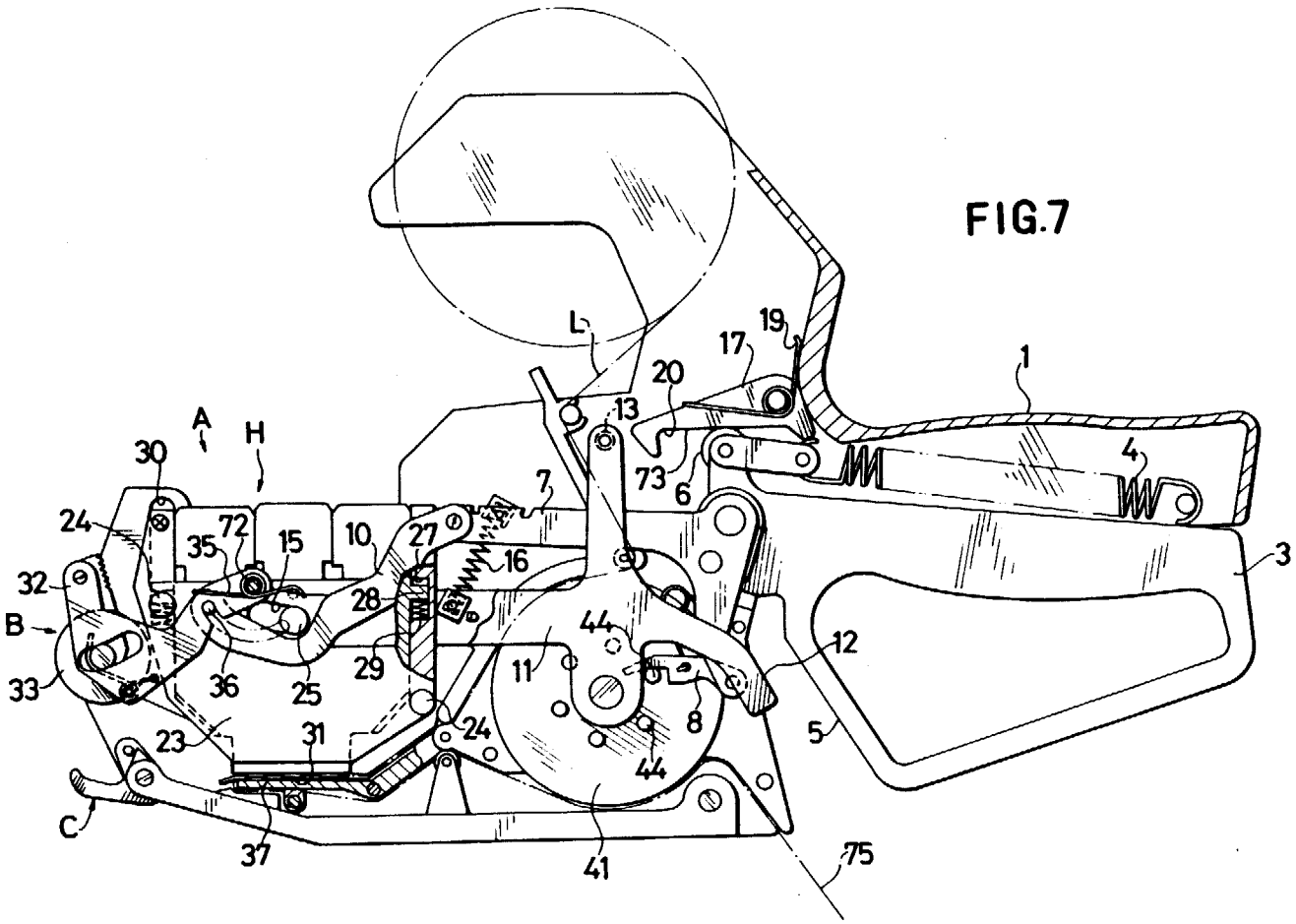
FIG. 7 is the same type of view as FIG. 2, in which the hand lever is fully squeezed and the type faces of the printing head are brought into contact with the label strip on a platen.

When the hand lever 3 is further squeezed, from the position shown in FIG. 6 to the position shown in FIG. 7, the contact roller 6 further pushes up the bottom face 73 of the pawl 17, and the hook 20 of the pawl 17 is released from its grip on the fastening roller 13. Now, the forward arms of the cross-shaped yoke members 11 having slots 15 are pushed down by the force of springs 16 while the inclined surfaces 12 at the rear of members 11 are left free of the lever 3 at this stage. The driving pins 25 on the printing head A which are held in the slots 15 are forced down. Accordingly, the printing head A with its guide pins 24 in engagement with the grooves 30 is suddenly pushed down.

When the guide pins 24 reach the restraint at the lower ends of the grooves 30 in the downward movement of the printing head A, only the casing 23 is suddenly stopped at that position. At this position, the type faces 31 of the printing devices 22 of the printing head portion H in the casing 23 have not yet made contact with the label strip L on the platen 37 and there is a slight space between the label strip L and the type faces 31. The vertical position of the printing head portion H relative to the casing 23 is set in such manner that, when the springs 29 in the recesses 27 of the casing 23 are fully extended, the type faces 31 of the printing head portion H carried in the casing 23 are not in contact with the surface of label strip L.

Referring to FIG. 7, the printing head portion H has the inertia of its downward movement and although the casing 23 has stopped, the printing head portion H compresses the springs 29 and strikes the type faces 31 against the label 76 of the label strip L that is then being supported on the platen 37.

Figure 8:
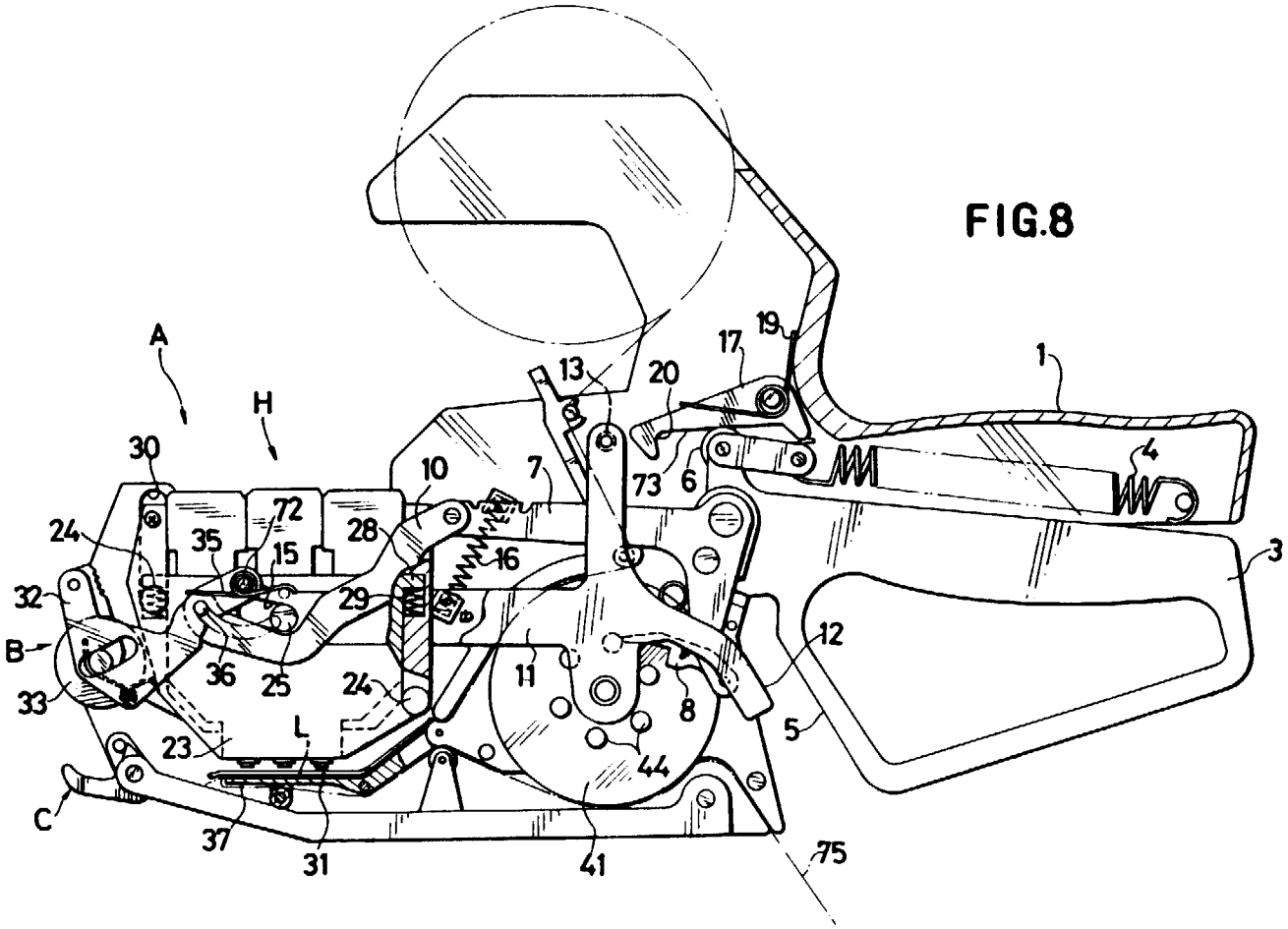
FIG. 8 is the same type of view as FIG. 2, in which the type faces of the printing head are slightly separated from the label strip after the type faces have contacted the label strip on the platen.

Next, as shown in FIG. 8, the printing head portion H is returned or raised a small distance off the label 76 by the return means thereof comprising the reaction of the springs 29 and the rebound caused by the type faces bumping against the label 76 on the platen 37. The top surfaces of projections 28 of the printing head portion H are pressed against the ceiling surfaces of the recesses 27 in the casing 23 by the force of the springs 29, thereby stopping and supporting the printing head portion H at that slightly raised position.

Regardless of the strength of the squeeze exerted by the operator on the hand lever 3, the printing head A always strikes against the label strip L with the same force by the force of the springs 16. Immediately after a label is printed, the printing head portion H is separated from the label strip L by the rebound of the strike and the reaction force of the springs 29. Therefore, the type faces 31 strike the label strip L with regular and uniform pressure, and precise and stable printing on label strip L can be attained without fail.

Figure 9:
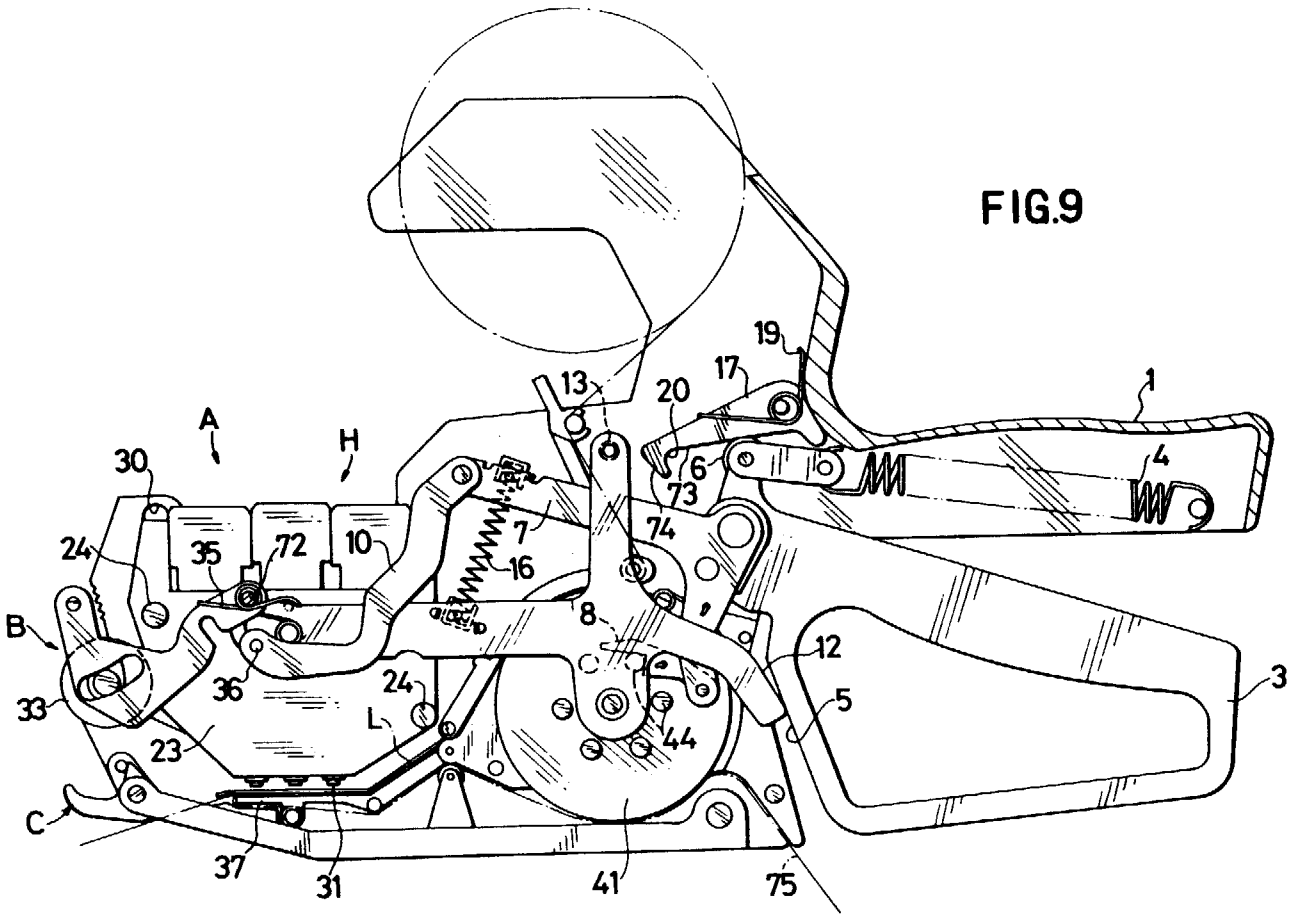
FIG. 9 is the same type of view as FIG. 2, in which the hand lever has been partially released.

When the hand lever 3 has been partially released to the state shown in FIG. 9, the yoke 7 and hand lever 3 pivot clockwise under the influence of the spring 4. The yoke 7 pulls the driving levers 10 rearward. But, the inking device B remains at its forward position because the printing head A is still at its lower position in this stage. At the same time, the hook 8 pushes one pin 44 on wheel 41 forward. The advancing roller 41 is thereby intermittently rotated to shift the label strip L for a certain length.

When the hand lever 3 is entirely released and shifts from the state shown in FIG. 9 to that shown in FIG. 2, the inclined rear surfaces 12 of cross-shaped yoke members 11 are engaged and then pushed forward by the lower front surface 5 of the hand lever 3 which is pivoting clockwise. This also is part of the return means of the first embodiment. This pivots the cross-shaped yoke members 11 clockwise which, in turn, raises the slots 15, the driving pins 24 and the printing head A. Raising of the printing head frees the ink roller 33 of the inking device B to move toward the rear underside of the printing head A due to the bias of the springs 35. The fastening roller 13 at the end of the upper leg of the yoke member 11 is pivoted clockwise to engage the inclined front surface 74 of the pawl 17. The front end of the pawl 17 is raised by the rearward movement of the fastening roller 13, until the fastening roller 13 snaps into and is finally caught by the hook 20 of the fastening pawl 17. This reestablishes the restraint of the printing head. The contact roller 6 is separated from the undersurface 73 of the pawl 17 when it moves under the influence of roller 13.

As the label strip L is advanced for the length of a label 76 by the intermittent rotation of the advancing roller 41 caused by the hook 8, the printed label is also advanced and peeled from the backing paper 75 in the peeling section 38. The peeled label is paid out under the label applying device C. This device presses the label against the surface of an article.

Figure 10:
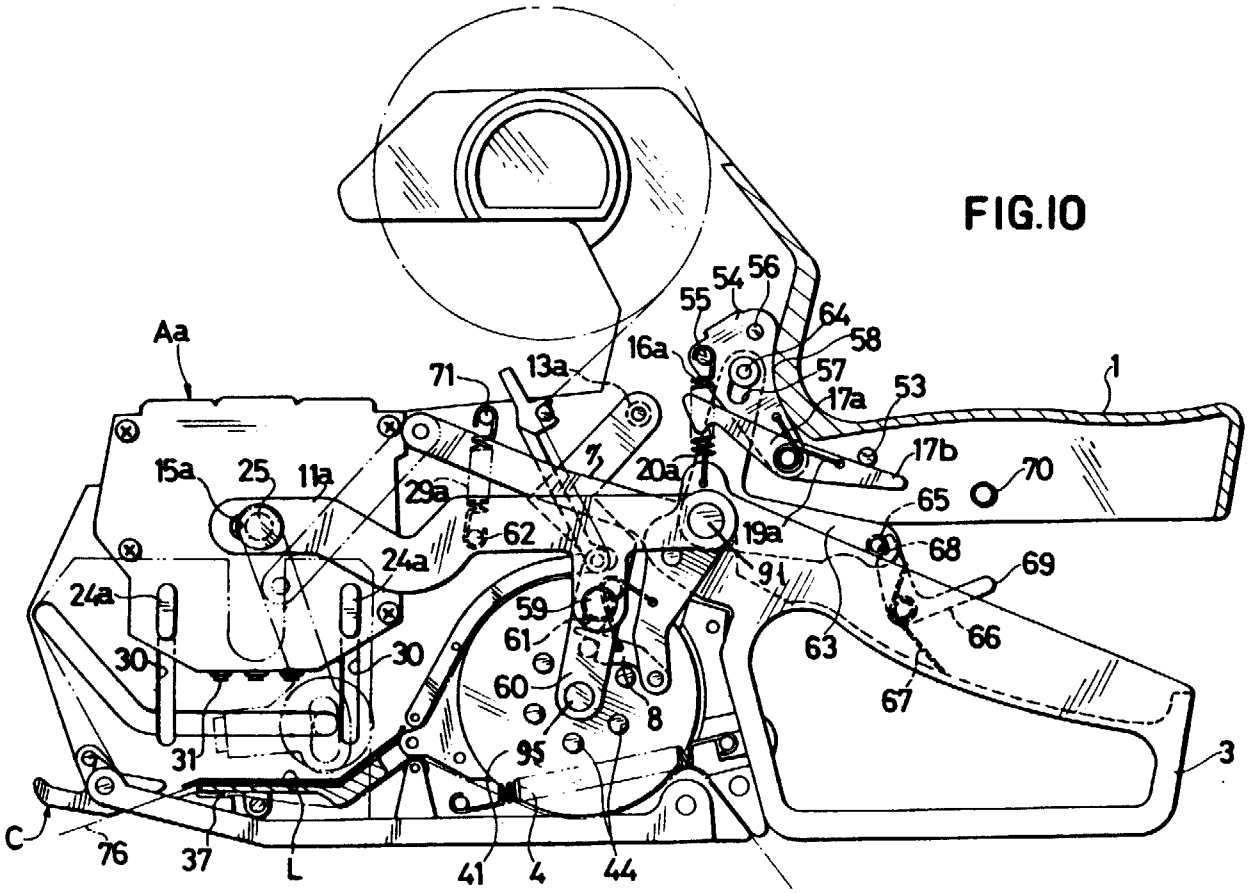
FIG. 10 is a partially cross-sectional, side elevational view of a portable label printing and applying machine containing a second embodiment of the present invention, in which the machine frame on the viewing side is removed and the hand lever is released.
Figure 11:
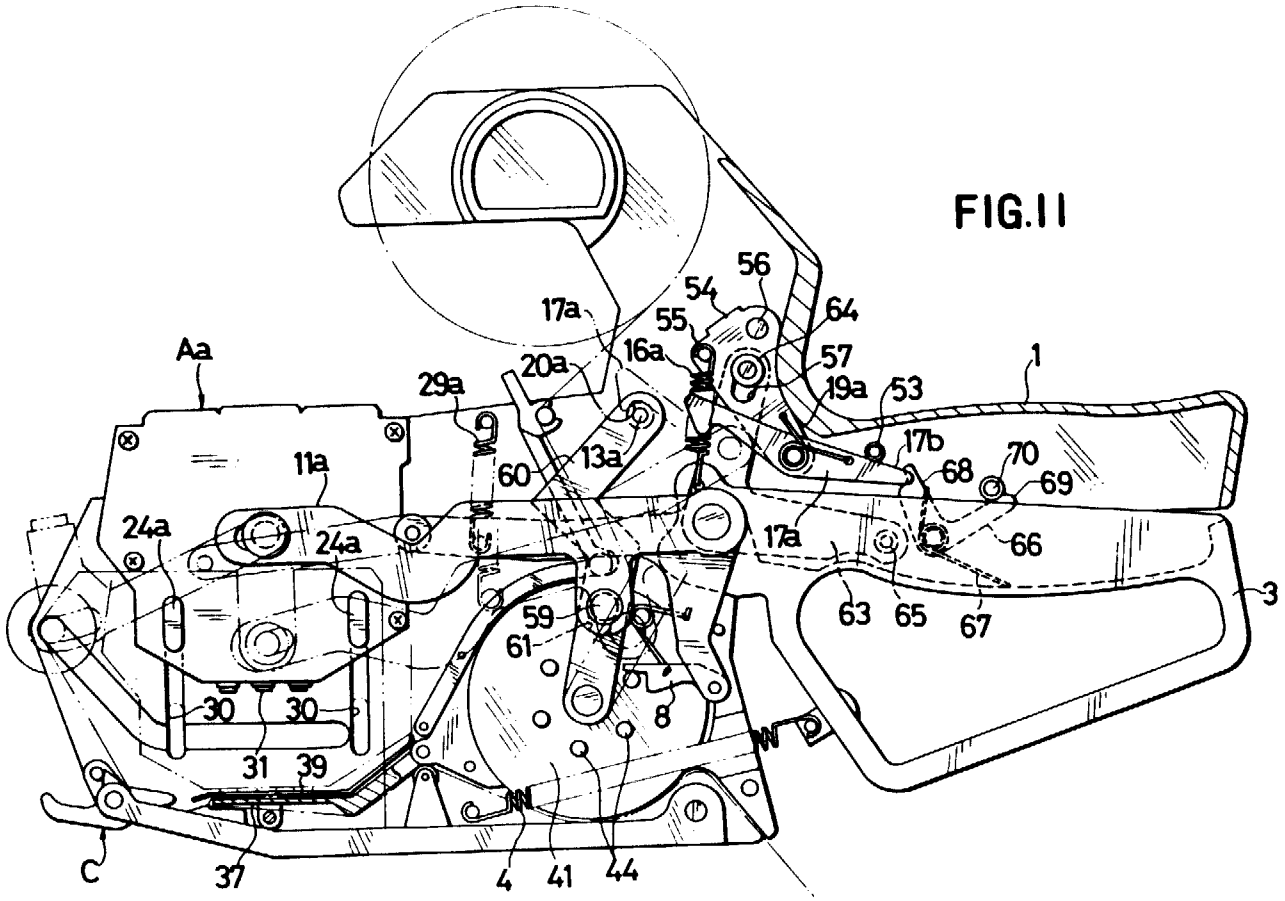
FIG. 11 is the same type view as FIG. 10, in which the hand lever is fully squeezed.

With reference to FIGS. 10 and 11, a portable label printing and applying machine containing a second embodiment of the invention is now described. Where the elements of the second embodiment are the same as those of the first embodiment, they are respectively represented by the same reference numerals and they are not reexplained. Elements corresonding in function to but differing somewhat in structure from those of the first embodiment are correspondingly numbered with reference numerals followed by an "a".

The T-shaped yoke members 11a are pivotally secured to the same shaft 91 that carries the hand lever 3.

The yoke members 11a have driving pins 59 in their lower legs and have slots 15a formed in their front ends.

Springs 29a are stretched between the pins 71 fixed on the machine frame 2 and the pins 62 fixed on the T-shaped yoke members 11a. This pulls the forward arms of T-shaped yoke members 11a, having slots 15a, upward.

The rocking levers 60 are pivotally supported on the shaft 95 supporting the label moving means comprised of label strip advancing roller 41. The rocking levers 60 each have a slot 61 in the middle portion. The levers 60 also have a fastening roller 13a at their upper free ends. The driving pins 59 of the T-shaped yoke members 11a are fitted into the slots 61 so as to interconnect the yoke members 11a and the rocking levers 60.

There is a connection means for connecting the printing head with the means that moves it. The connection means comprises yet another rocking lever 54 which is pivotally mounted to the labeler frame by shaft 56.

The spring 16a is stretched between the hand lever 3 and the pin 55 on one end of the rocking lever 54 to connect the rocking lever 54 and the hand lever 3. The spring 16a urges the rocking lever 54 counterclockwise in FIG. 10 about the shaft 56.

A connection means engaging element for engaging the printing head, as described below, is provided. It comprises pawl 17a pivotally secured to the lower end portion of the rocking lever 54 away from the pin 55. The rear side 58 of the rocking lever 54 rests against the inside wall of the grip 1. The pawl 17a is urged counterclockwise by a spring 19a. The rear upper surface 17b of the pawl 17a abuts a pin 53, so that the pawl 17a remains at the illustrated pivot position and the hook 20a of the pawl 17a can catch the fastening roller 13a on the rocking levers 60 when the pawl 17a is moved forward.

An L-shaped lever or connecting link 63 is pivotally attached to the shaft 91. Lever 63 has a pin 64 in its upper arm and also has a pin 65 in its rear arm. The pin 64 is fitted into the slot 57 of the rocking lever 54. The rocking lever 54 is rocked about shaft 91 by the pivoting movement of the L-shaped lever 63.

An L-shaped lifting hook 66 is pivotally attached to the hand lever 3. It is urged counterclockwise by a spring 67. In the normal state, the hook portion 68 of the hook 66 rests on the pin 65 of the L-shaped lever 63. When the hand lever 3 is squeezed to the grip 1, the rear portion 69 of the L-shaped hook 66 engages and is pushed down by the disengaging means or pin 70 fixed on the grip 1 and the hook portion 68 is released from the pin 65.

The printing head Aa holds the printing devices within a casing. The projections on the sides of the casing of the printing head Aa 24a vertically guide the printing head Aa. Each of the projections 24a is fitted into a respective vertical guide slot 30 formed in the inner wall surface of the machine frame 2. The driving pins 25 vertically drive the printing head Aa. The driving pins 25 are received in the slots 15a at the front of the T-shaped yoke members 11a and they cause the printing head Aa to move according to the pivoting movement of the T-shaped yoke members 11a. When the projections 24a are moved to the lower ends of the slots 30 in the machine frame, the type faces 31 of the printing head Aa are caused to move into contact with the label 76 of the strip L that is then on the platen 37.

The operation of the second embodiment of the invention is now described.

When the hand lever 3 is squeezed, the label printing machine moves from the state shown in FIG. 10 to the state shown in FIG. 11. The L-shaped hook 66 is raised. The pin 65 is pushed up by the hook portion 68 of the hook 66 and this turns the L-shaped lever 63 counterclockwise. With this movement, the rocking lever 54 is turned clockwise about the shaft 56 and this moves the pawl 17a forward. Thus, as shown in FIG. 11 by a double dot-chain line, the hook portion 20a is moved into engagement with the fastening roller 13a.

At almost the same time as the engagement between hook portion 20 and roller 13a, the rear portion 69 of the L-shaped hook 66 is pushed down by the disengaging means pin 70 on the grip 1 and this releases the pin 65 of the L-shaped lever 63 from the hook portion 68 of the L-shaped hook 66. When the lever 63 becomes free, the pin 55 of the rocking lever 54 is suddenly pulled by the spring 16a and the rocking lever 54 is turned counterclockwise about the shaft 56 and moves the connection means pawl 17a rearwardly. The hook portion 20a of the pawl 17a which is in engagement with the fastening roller 13a, quickly pulls the roller 13a rearwardly. The rocking levers 60 are accordingly turned clockwise against the force of the spring 29a.

Because the driving pin 59 of yoke members 11a is held in the slot 61 of the rocking levers 60, when the rocking lever 60 is rocked clockwise around shaft 95, the T-shape yoke members 11a are turned counterclockwise and downwardly around shaft 91. This shifts the driving pins 25 down and lowers the printing head Aa with the projections 24a guided by the grooves 30. The type faces 31 of the printing head Aa are struck against the label strip L of the platen 37. Thus, the label strip L can be printed.

Simultaneously with return motion of the pawl 17a to the right caused by the counterclockwise pivoting of rocking member 54, the rear upper surface 17b of the pawl 17a is engaged and forced down by the disconnection means comprising the pin 53 in the grip 1, so that the fastening roller 13a is released from the hook portion 20a of the pawl 17a. This frees the rocking lever 60. Since the T-shaped yoke members 11a are continuously pulled up by the printing head return means spring 29a, the T-shaped yoke members 11a are suddenly turned clockwise by the rebound of the stroke of the printing head Aa on the platen 37 and the tension of the spring 29a. Therefore, the printing head Aa is raised and the rocking lever 60 is moved to pivot counterclockwise around shaft 95.

When the hand lever 3 is released, it is moved clockwise and away from grip 1 by the force of the spring 4 between the lever 3 and the machine frame. The advancing roller 41 is rotated by the hook 8 on the yoke 7 of the hand lever 3 to move the label strip L forward for one label length. This delivers the printed label 76 under the label applying device C. The hook portion 68 of the L-shaped hook 66 rests against the pin 65 of the L-shaped lever 63, and when the hand lever 3 is completely released, the above hook portion 68 reengages the pin 65.

Figure 12:
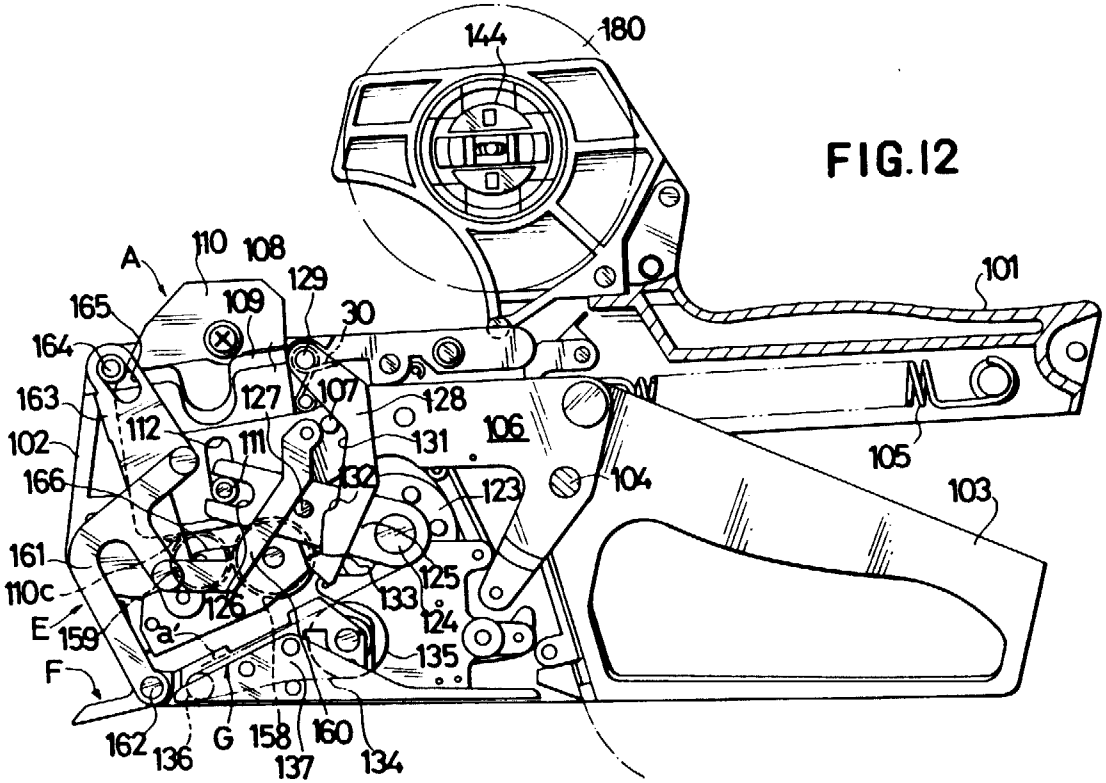
FIG. 12 is a side elevational view of a label printing and applying machine in which the machine frame on the viewing side is removed and the hand lever is released and which is provided with a constant printing pressure mechanism according to the third embodiment of the present invention.

The third preferred embodiment of a constant printing pressure mechanism of the present invention and a label printing and applying machine containing this embodiment are now described. As shown in FIGS. 12, 13, 17 and 21, a hand grip 101 is affixed to and projects from the rear (right side) of the machine frame 102. A hand lever 103 is pivotally secured to the machine frame 102 at a pivot shaft 104 and the lever 103 is pivot-able relative to the grip 101. The hand lever 103 is pulled clockwise by a driving spring 105. Thus, as shown in FIG. 12, the lower front (left) face of the hand lever 103 is urged against the rear face of the machine frame 102.

A yoke 106 is carried on the pivot 104 and is connected to pivot with the lever 103. The yoke 106 has a pair of parallel arms. Each yoke arm has a restraining means release means pin 107 projecting from its side intermediate its length. A printing head A is attached to the front ends of the arms of the yoke 106.

The printing head A comprises a printing device 110 having a pair of separated side frames 110a and a plurality of stamp belts 110b held between the side frames 110a. A pair of slide plates 109 are outside of and they support the printing device 110. A pair of outer frames 108 carry the slide plates 109 and the below described constant pressure springs 117 and return springs 118.

In the printing head A, each inside wall of the outer frames 108 is provided with a pair of inwardly projecting slide pieces 113 that are received in a pair of correspondingly placed, opposed vertical grooves 115, which are formed in the middle portion of the outer wall of each slide plate 109. Constant pressure springs 117 are inserted in the vertical grooves 115 under the above mentioned slide pieces 113 and normally bias the pieces 113 upwardly. Near both side edges of each inside wall of the slide plate 109, a pair of vertical grooves 116 are defined. Grooves 116 fittingly receive a pair of correspondingly placed, opposed slide pieces 120 which are formed on and project outwardly from each side frame 110a. Return springs 118 are held under the slide pieces 120 in the vertical grooves 116 and urge pieces 120 and frames 110a upwardly. Thus, both of side frames 110a and outer frames 108 are biased up with respect to slide plates 109.

In the inside wall of each outer frame 108, frustoconical holes 114 are formed. Correspondingly placed generally opposed frustoconical holes 121 are formed in the outside wall of each side frame 110a. There is in opposition to both of the holes 114, 121 a groove 119 in the wall of each side plate 109. Groove 119 has a back to back V-shaped taper opening each to cooperate with one of holes 114, 121. Steel balls 122 are placed in the holes 114 and 121 and are received in grooves 119 so as to facilitate the below described relative movement in the vertical directions of the outer frames 108, the slide plates 109 and the side frames 110a of the printing device 110.

Figure 21:
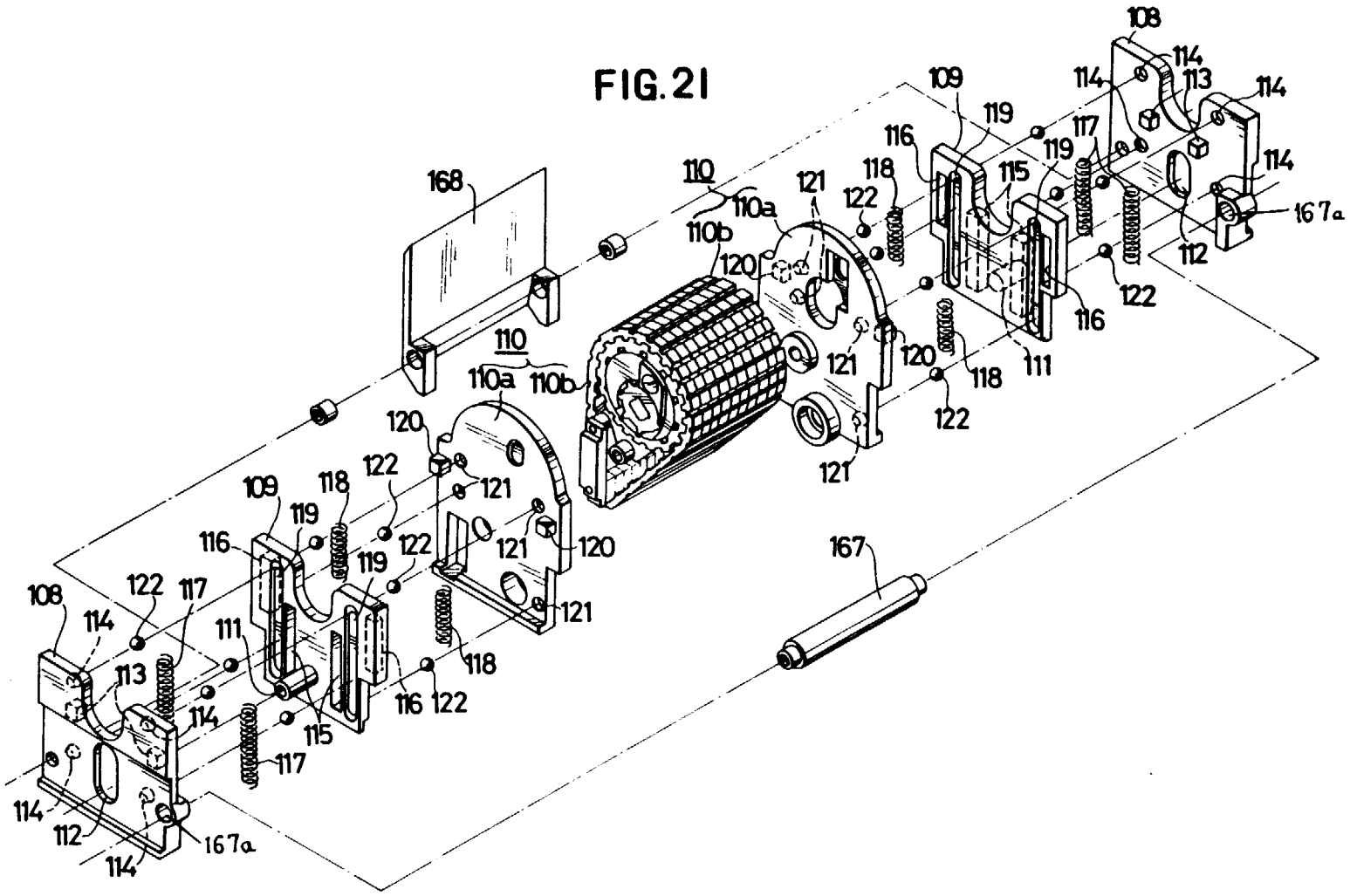
FIG. 21 is an exploded perspective view of the printing head of the third embodiment of the invention.

Further, both of the outer frames 108 of the printing head A have a portion that projects to the rear of the printing head A beyond side plates 109 and side frames 110a. In each projecting portion of each outer frame 108 is defined a hole 167a for receiving a fixing shaft 167 (FIG. 21). Shaft 167 holds the frames 108 and holds the slide plates 109 and the printing device 110 between the frames. A front cover 168 is applied on the front side of the printing device 110. It is held in place at the front sides of the outer frames 108.

Attached to the outwardly facing sides of the slide plates 109 are fixing rollers 111 which extend through the vertically elongated slots 112 of the outer frames 108. Turning to FIG. 12, the fixing rollers 111 are supported in the fork 126 at the tip ends of a pair of spaced apart constant pressure stop or action levers 125 that are pivotally secured on the opposite ends of the stationary main shaft 124 of a label strip advancing roller 123. Shaft 124 is supported on frame 102. The action levers 125 are respectively provided with stop pins 127 projecting from their outside walls intermediate the length of the levers 125.

A printing head motion restraining means comprised of a pair of constant pressure hooks 128 are pivotally secured to the machine frames 102 at a pivot shafts 129. The hooks 128 are brought into engagement with the stop pins 127 of the action levers 125 and with the reset pins 107 of the yoke 106 by operations described below. The constant pressure hooks 128 are urged clockwise by the springs 130 that are supported on the pivot shaft 129. On the forward edges of the hooks 128, the upper inclined surfaces 131, with steps 132 beneath them, are formed. These are engageable with the reset pins 107. A pair of hook portions 133 are formed near the free ends of the hooks 128, and the hook portions are engageable with the stop pins 127.

Below the printing head A, there is a transferring belt device G for transferring a single label a'. The belt device G comprises an endless transferring belt 134 made of elastic material, such as silicone rubber, and a larger rear roller 135 and a smaller front roller 136 that carry the transferring belt 134 wrapped around them. Along the supporting portion of the transferring belt 134, the platen 137 is attached under the belt 134. Slightly raised belt supporting frames 138 are attached on both sides of the platen 137.

The operation of the third embodiment of the constant printing pressure mechanism of the present invention is now explained. A previously cut single label a' is transferred from the below described cutting device to a predetermined printing position on the transferring belt device G.

Figure 13:
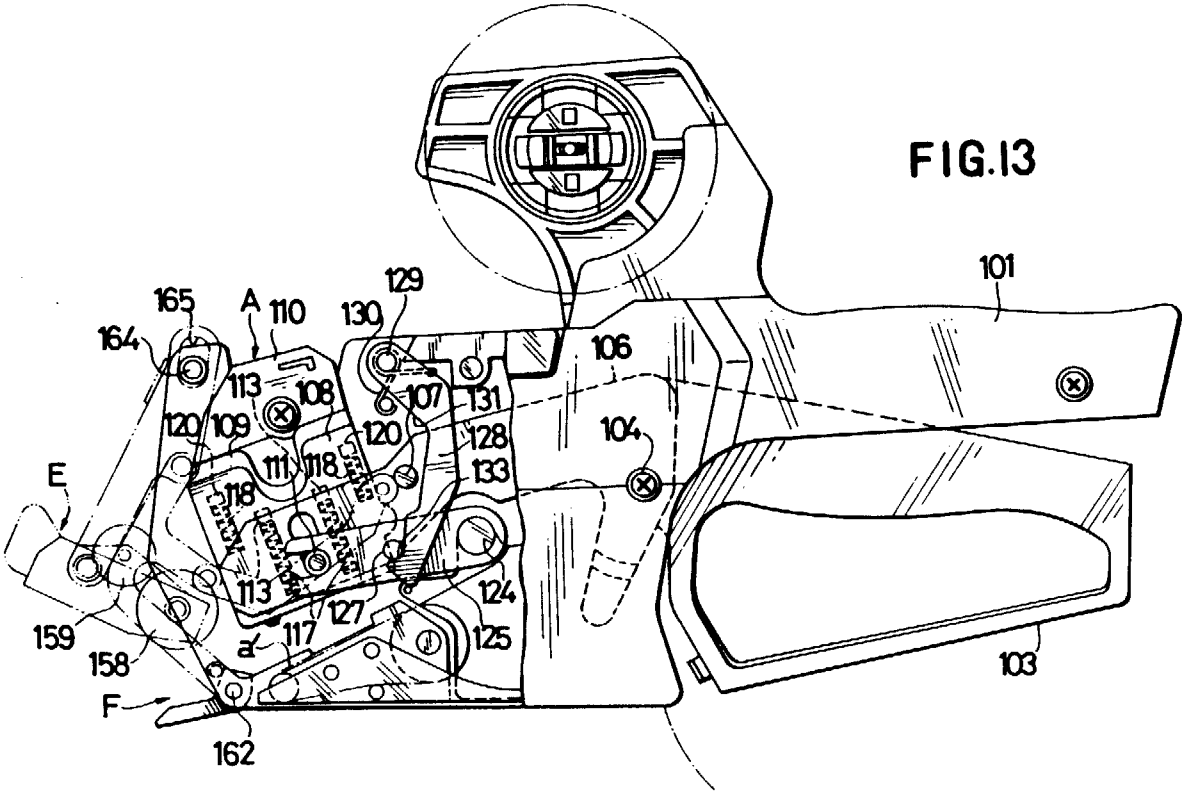
FIG. 13 is a side elevational view like FIG. 12, wherein the hand lever is squeezed halfway and the whole body of the printing head is momentarily stopped.

When the hand lever 103 is squeezed halfway, the printing head A is moved from the rest position of FIG. 12 to the position shown in FIG. 13. The yoke 106 is pivoted counterclockwise about the pivot 104 with the hand lever 103. The pivoting head A attached to the yoke 106 pivots with it. The fixing rollers 111 projecting from the printing head A pivot the constant pressure action levers 125 counterclockwise about the main shaft 124. In synchronism with this action, the front edges of restraining means or pressure hooks 128 are spring biased into continuous contact with the discharge means reset pins 107 of the yoke 106. The shaping of hook surfaces 131 combines with the pivot pathway of yoke 106 to cause the hooks 128 to turn clockwise about the pivot 129.

When the hand lever 103 is squeezed further, the hook portions 133 of the constant pressure hooks 128 come into engagement with the counterclockwise pivoting, descending stop pins 127 on the action levers 125. Further pivoting of action levers 125 is blocked. Thus, the descending printing head A is temporarily stopped in the state shown in FIG. 2.

Figure 14:
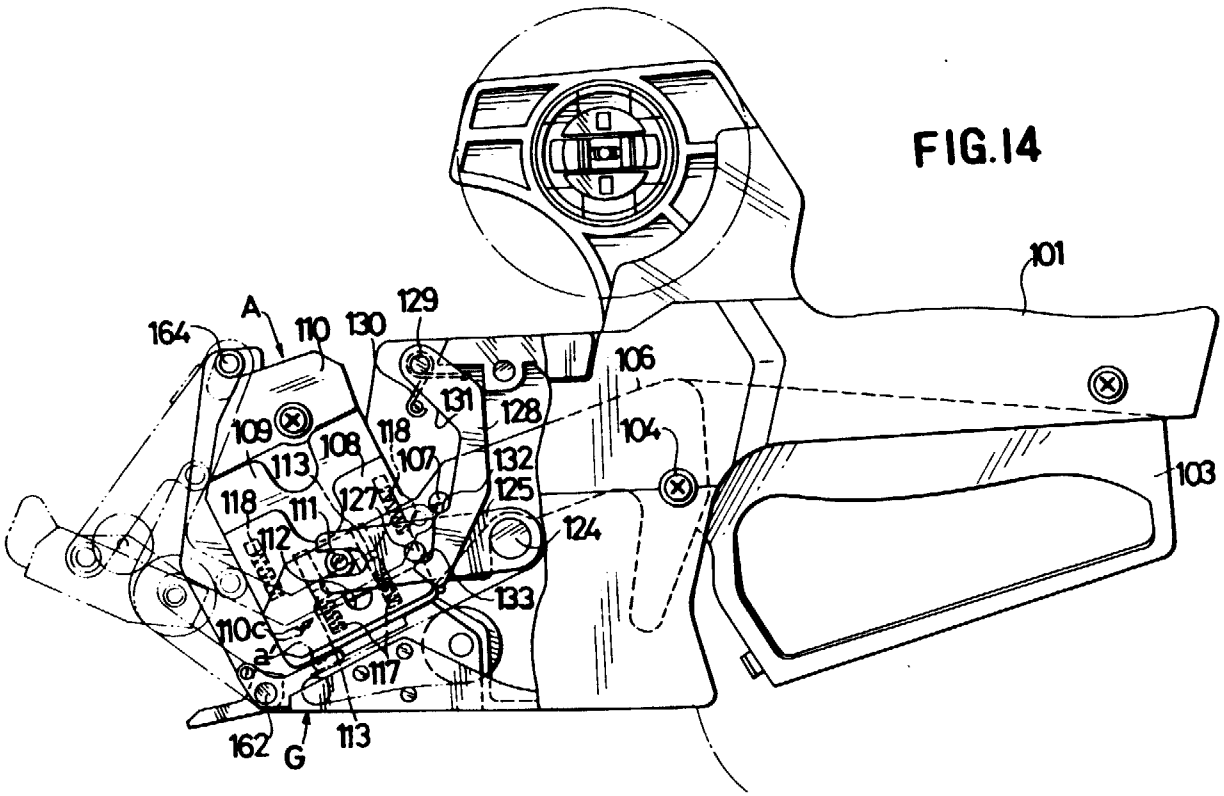
FIG. 14 is a side elevational view, like FIG. 13, in which the hand lever is in the state just before it is completely squeezed and only the outer frames of the printing head are moved down.
Figures 17, 18, 19, 20:
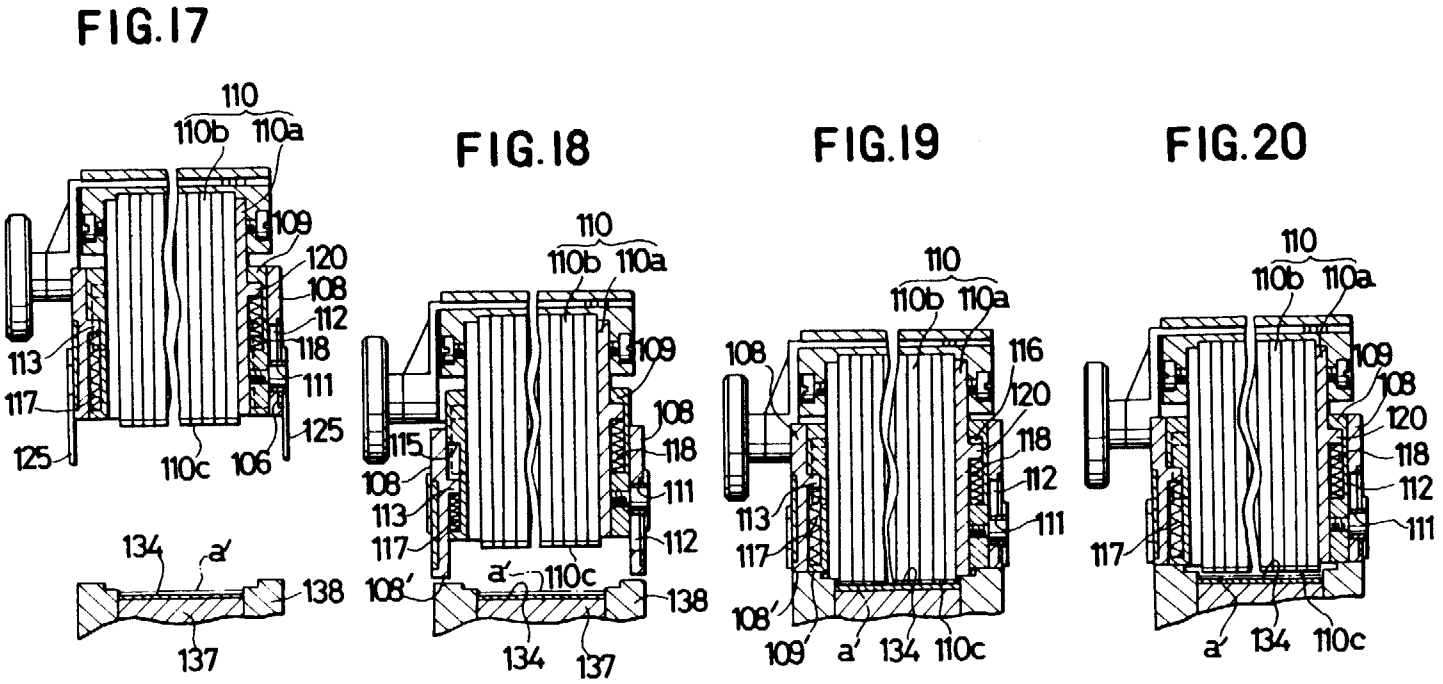
FIG. 17 is a vertical cross-sectional end view of the printing head of the third embodiment of the invention in the normal state of the labeling machine as shown in FIG. 12.
FIG. 18 is a vertical cross-sectional end view of the printing head of the third embodiment of the invention in the state of the labeling machine shown in FIG. 14, in which only the outer frames of the printing head are moved down relative to the printing device.
FIG. 19 is the same view of the printing head with the labeling machine in the state shown in FIG. 15, in which the printing device and the slide plates of the printing head are moved down simultaneously and quickly so as to perform the printing action.
FIG. 20 is the same view of the printing head with the labeling machine in the state shown in FIG. 16, in which the type face of the printing device is slightly raised from the surface of a label being printed.

Further squeezing of the hand lever 103 moves the printing head A to the state shown in FIGS. 14 and 18 which is immediately before the complete squeezing.

More particularly, the reset pins 107 again push against and trace down along the inclined surfaces 131 of constant pressure hooks 128. When the reset pins 107 reach the lower portions of the inclined surfaces 131, they pivot the constant pressure hooks 128 counterclockwise about the pivot 129 against the force of springs 130. This disengages the hook portions 133 of the constant pressure hooks 128 from the stop pins 127 of the stop levers 125. During the portion of the descent of yoke 106 between its position of FIGS. 13 and 17 and its position of FIGS. 14 and 18, only the outer frames 108 of the printing head A are moved down. The fixing rollers 111 are held against descent by the action levers 125 which are blocked from then pivoting. Thus, rollers 111 are guided up along the frames 108 by the slots 112 of the outer frames 108. The slide plates 109 and the printing device 110 are not moved as the rollers 111 connected thereto are restrained. The constant pressure springs 117 interposed between the outer frames 108 and the slide plates 109 are compressed by the descending slide pieces 113 that are formed on the inside walls of the outer frames 108.

Figure 15:
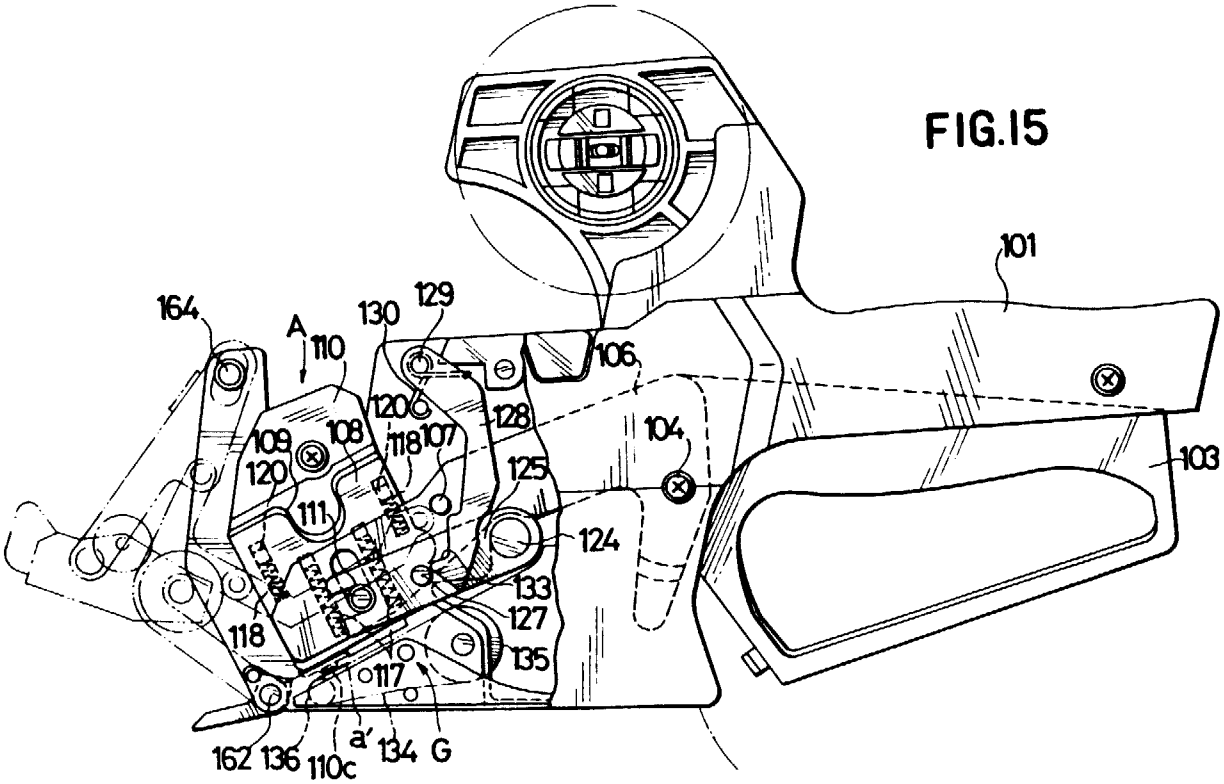
FIG. 15 is a side elevational view, like FIG. 14, in which the hand lever is completely squeezed, the slide plates of the printing head are moved down simultaneously and quickly, and the type face is brought into contact with the surface of a label being printed.

When the hand lever 103 is completely squeezed, the printing head A moves from the state shown in FIGS. 14 and 18 so that shown in FIGS. 15 and 19. The ends of the constant pressure action levers 125 are freed when the stop pins 127 are released from the hook portions 133 of the constant pressure hooks 128. The printing device 110 and the slide plates 109 are moved down simultaneously and rapidly by the restoring energy of the compressed constant pressure springs 117.

The undersurfaces 108' of the outer frames 108 and the undersurfaces 109' of the slide plates 109 are brought into contact with the top surfaces of the belt supporting frames 138 during the printing action in order to stabilize the printing and serve as a second restraining means for halting further descent of the slide plates 109.

The type face 110c of the printing device 110 is urged past the halted slide plates 109 and against the single label a' with a constant, spring controlled printing pressure and the label a' is clearly printed.

In the rapid downward movement of the printing device 110 and the slide plates 109, the return springs 118 are slightly compressed by the slide pieces 120 of the side frames 10a with the descending energies of the printing device 110 and the slide plates 109 (see FIG. 19).

Figure 16:
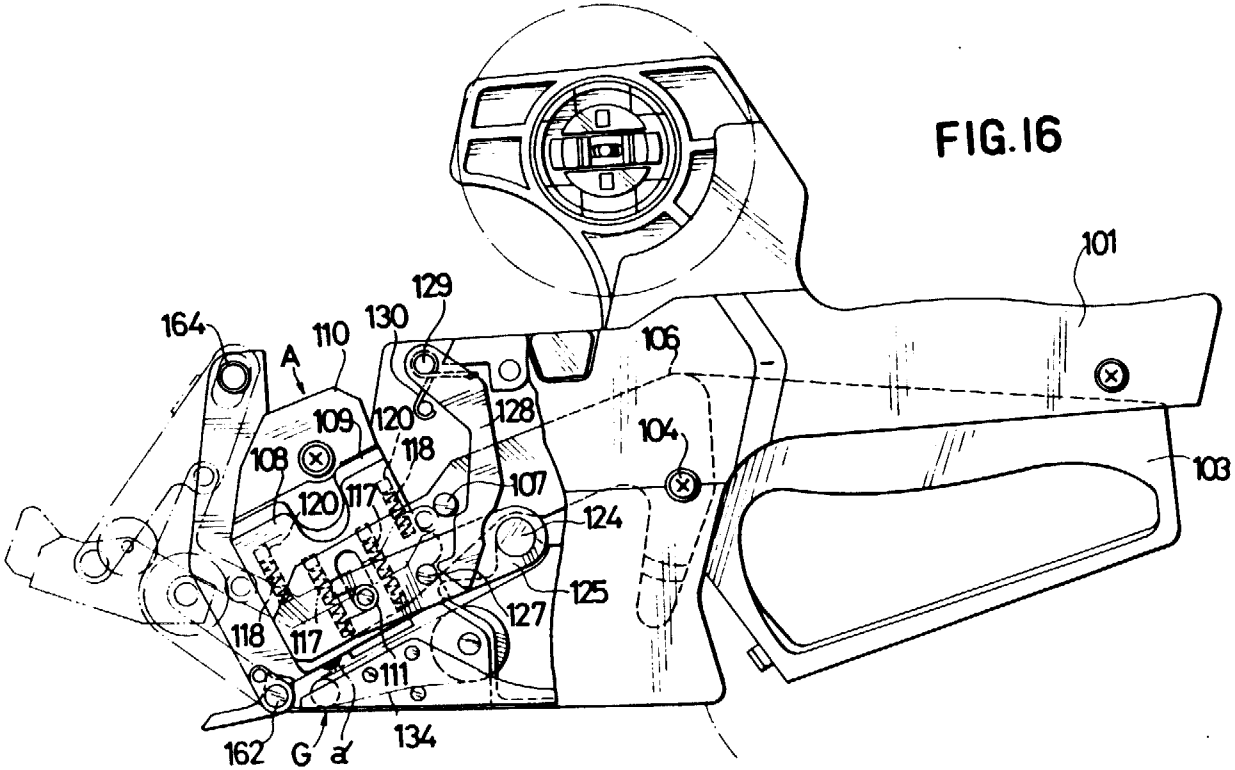
FIG. 16 is a side elevational view like FIG. 15, in which the hand lever has remained completely squeezed, but the type face of the printing device has been slightly raised from the surface of the label being printed.

When the hand lever 103 is completely squeezed, the printing head A next moves from the printing state shown in FIGS. 15 and 19 to the state shown in FIGS. 16 and 20. The printing device 110 of the printing head A is raised and stopped at a distance of about 2 to 3 mm. above the printed label a' by the reaction to the rapid downward movement of the printing device and the repelling force of the compressed return springs 18.

When the hand lever 103 is released, it is returned to the normal position shown in FIG. 12 by the driving spring 105. This returns the yoke 106 which returns the whole body of the printing head A to the normal state shown in FIGS. 12 and 17.

Because this embodiment of the invention comprises a printing head with built-in constant pressure springs and return springs which selectively actuate three kinds of members, the types, the slide plates and the outer frames, the type faces of the printing device is brought into contact with a single label with a constant printing pressure for a uniform period of time by the restoration energy of the compressed constant pressure springs and highly precise printing on the label is obtained.

Furthermore, immediately following the rapid lowering of the printing device during printing, the type face of the printing device is immediately raised a slight distance from the surface of the printed label by the force of slightly compressed return springs and by the reaction to the rapid descent of the printing device. Therefore, the contact time of the type face against the label surface is a uniform moment. Thus, ink-staining or ink spreading on labels will not occur during the contact between the type face and label, and clear printing can always be expected.

The labeling machine including this third embodiment of the invention has other units and subassemblies.

The driving source for the transferring belt device G is an advancing roller device J (FIG. 23) for the advancing label strip a. The cutting of the label strip a to obtain a single piece of cut label a' is carried out by a cutting device D which will be described later.

Figure 22:
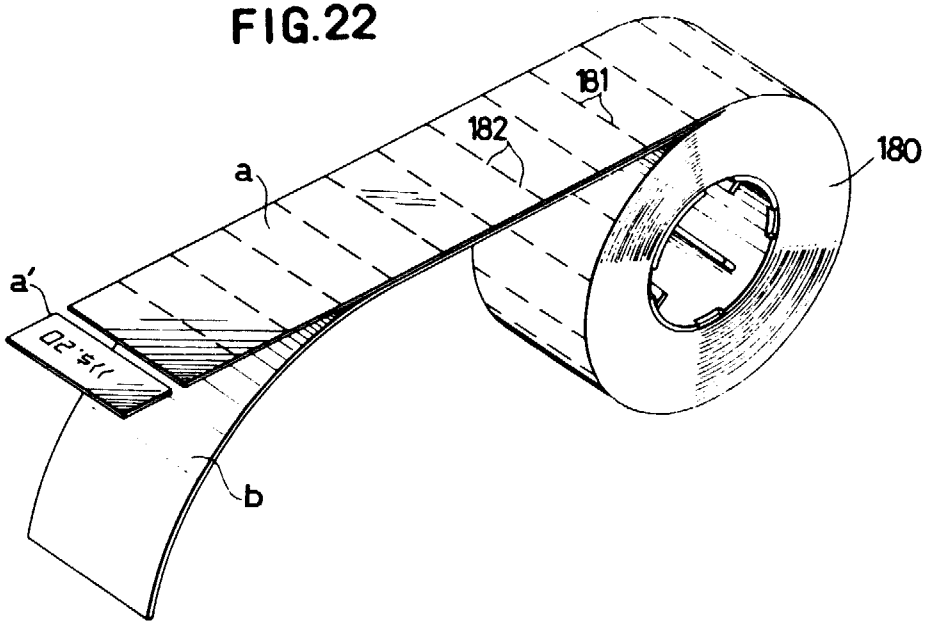
FIG. 22 is a perspective view of a rolled label strip to be operated upon by the printing head of the third embodiment of the invention.
Figure 23:
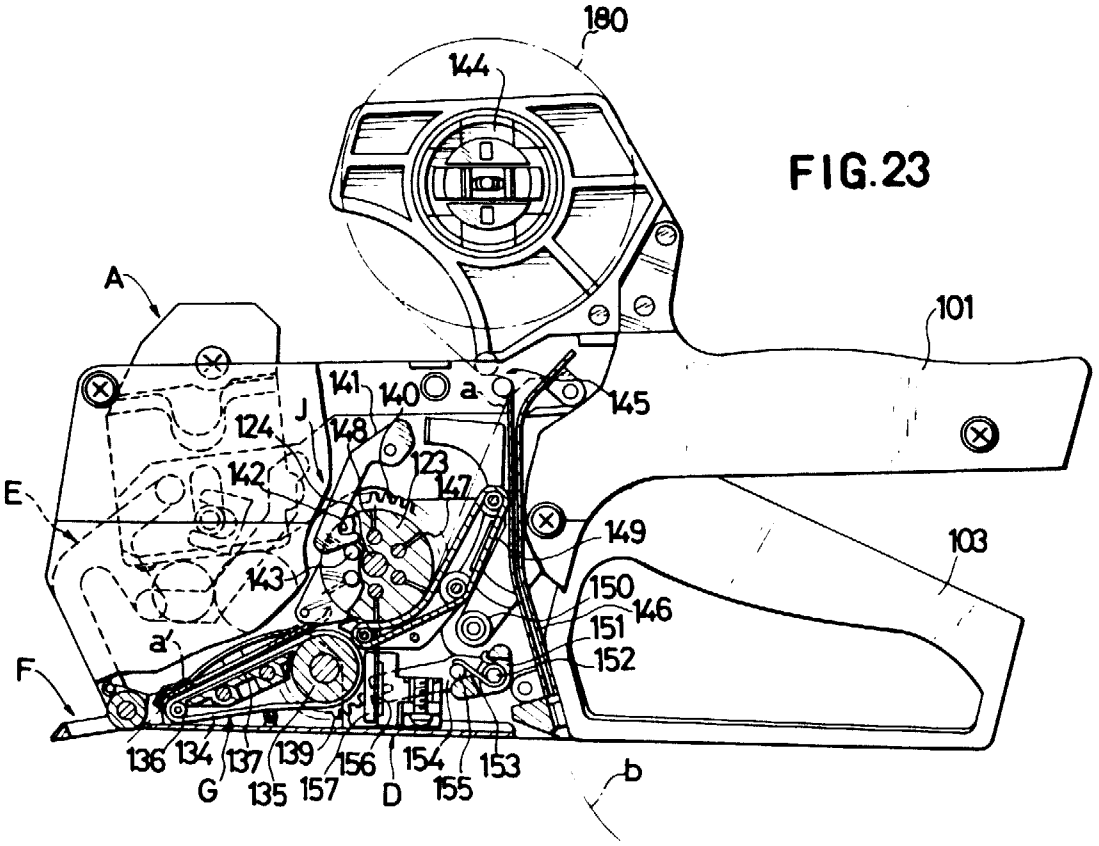
FIG. 23 is a side elevational view of the label printing and applying machine, in which a part of the machine frame on the viewing side is removed and showing an advancing roller device, a cutting device and a transferring belt device.
Figure 24:
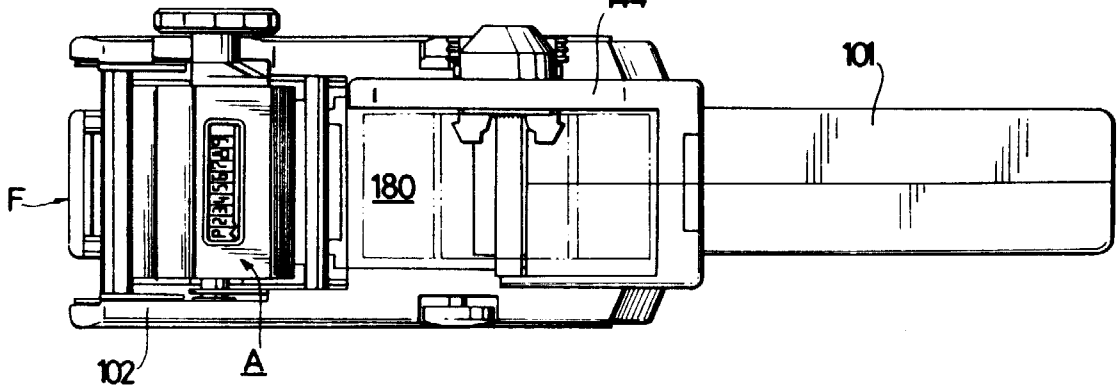
FIG. 24 is a plan view of the label printing and applying machine containing a constant printing pressure mechanism of the third embodiment of the invention.
Figure 26:
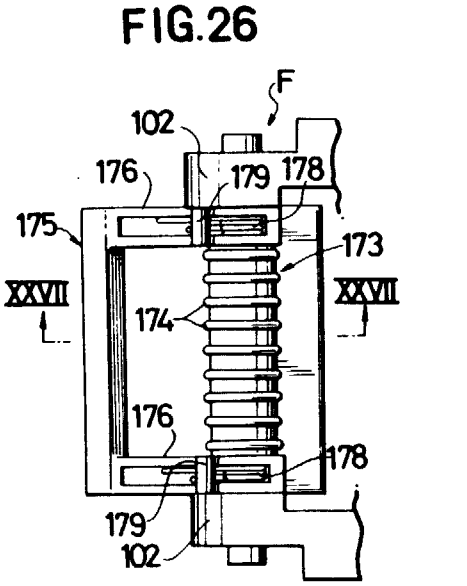
FIG. 26 is a plan view of the positioning device shown in FIG. 25.
Figure 27:
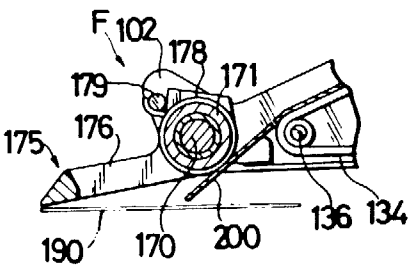
FIG. 27 is a vertical sectional view of the positioning device taken along the line XXVII—XXVII in FIG. 26.

As shown in FIG. 23, a rolled label strip 80 (FIG. 22) is carried by a core support 144. The free end of the rolled label strip 180 is separated into a label strip a and a backing paper b in the peeling section 145 of the labeler. A typical core supporting device 144 is described in U.S. application Ser. No. 650,622, filed Jan. 20, 1976. The peeled backing paper b is guided by a guide 146 and led to the outside of the machine body through the lower part of the labeler.

The cuts 181 formed at regular intervals along the peeled label strip a are caught by the advancing pawls 147 which project from the periphery of an advancing roller 123 on the advancing roller device J. The pawls transfer the label strip a for the length of a single label a'. A label strip advancing hook 141 is pivotally attached to the yoke 106. Hook 141 has a hook portion 142. Squeezing of the hand lever 103 engages and disengages the hook portion 142 with one indexing pin 143 at a time formed on the side wall of the advancing roller 123. Thus the advancing roller 123 is intermittently turned clockwise. In order that the cuts 181 in the label strip a will be caught by the advancing pawls 147 without fail, elastic material guide belts 149 are in forced contact with and move with the outer surface of the advancing roller 23 and hold the label strip against roller 123.

The label strip a is then cut off at the boundary line 182 between adjacent labels a' by the cutting device D.

The yoke 106 has downwardly extending projections, each of which pivotally supports a roller 150 that is moved into contact with the right hand end portion of a cam 151 by the counterclockwise movement of the yoke 106. Through such contact, the cam 151 is pivoted clockwise about the shaft 152 against the force of the spring 153. Then, the left hand end of the cam 151 is brought into engagement with the pin 155 projecting from an action lever 154 that is also pivotally attached on the shaft 152. The action lever 154 is turned clockwise about the shaft 152 by the cam 151, and the free left hand end of the action lever 154 is raised.

The forked left hand end of the action lever 154 engages with a lug of a cutter supporting member 157. The cutter or knife 156 is raised by the clockwise movement of the action lever 154. The cutter cuts a boundary line 182 of the label strip a to form a single label a'. During this cutting action, the cutter 156 enters one of the cutter guiding slots 148 of the advancing roller 123.

The single cut label a' is transferred to the printing position on the transferring belt 134 of the transferring belt device G, and it is then printed at the printing position by the printing head A. The larger roller 135 for the transferring belt 134 is provided with a coaxial gear 139 which meshes with a drive gear 140. The drive gear 140 is coaxially attached to the advancing roller 123. Thus, the intermittent rotation of the advancing roller 123 caused by the hand lever 103 is transmitted to the transferring belt 134 through the gears 140 and 139.

As shown in FIGS. 12 to 16, during the early stage of the squeezing of hand lever 103, the type face 110c is inked by the inking device E. The inking device has large and small inking rollers 158 and 159. A pair of action levers 160 are pivotally attached to the arms of the yoke and to the central arms of a pair of F-shaped levers 161. When the yoke 106 is pivoted down, the levers 161 are pivoted counterclockwise about the shaft 162 by the action levers 160. The end arms of levers 161 are pivotally supported on fixed shaft 162. The end of the main legs of the levers 161 are pivotally attached to the inking roller frame 163. Frame 163 is guided by and around a fixed pin 164 attached to the machine frame 102. The inking roller frame 163 is moved along its slots 165 as levers 161 pivot and roller frame 163 simultaneously turns clockwise about the fixed pin 164.

Because the whole inking device E turns together, the two inking rollers 158 and 159 carried by a roller supporting frame 166 are brought into forced contact with the type face 110c of the printing device 110.

As shown in FIGS. 14 to 16, the label printing and applying machine of the present invention is provided with a positioning device F for label application which is used when an indication on a label, such as the price, is to be corrected.

The positioning device F is comprised of a rotatable label applying roller 173 and a spring actuated gauge or frame 175 that is U-shaped in plan view. Fixing pieces 170 project from both side walls of the machine frames 102. The fixing holes 172 formed at both ends of a roller shaft 171 receive the fixing pieces 170. Ths roller shaft 171 carries an applying roller 173 having a plurality of circumferential ridges 174.

Figure 25:
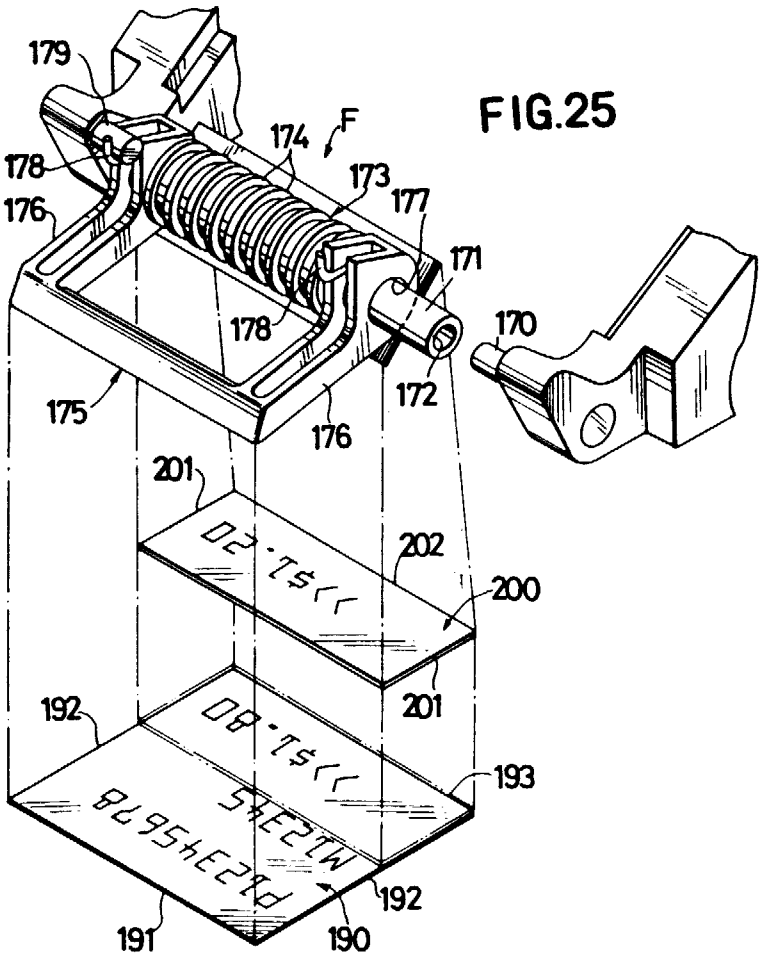
FIG. 25 is a perspective view showing the assemblage of one version of a positioning device for label application and showing the relationship between a correction label and a three-line label.

The arms 176 on both sides of the gauge 175 are themselves U-shaped. Fitting holes 177 are formed at the free ends of the arms 176. The end portions of the roller shaft 171 pass through the fitting holes 177 with play. Springs 178 are supported by the roller shaft 171 between the side arms 176. One end of each spring 178 rests on one of the spring pins 179 formed on the machine frame 102, and the other end of each spring 178 rests on the arm portion of the gauge 175. Accordingly, the gauge 175 is urged down (counterclockwise in FIG. 25) by the springs 178.

In the case when a three line label 190 is to be corrected, the front edge of the gauge 175 is set to overlay the upper edge 191 of the label 190, and both of the side arms 176 are set to overlay the side edges 192, and the gauge 175 is held down on the label 190. Then, with the operator holding the grip 101 of the label printing and applying machine with his hand, the machine is slid rearwardly with respect to the stationary label 190. Thus, the correction label 200 with a new price, for example, can be applied over the lower line with the old price of the three line label 190 by the applying roller 173. Both side edges 201 and the lower edge 202 of the correction label 200 can be brought into coincidence with the both side edges 192 and the lower edge 193 of the three line label 190.

The positioning device F can be used not only for the application of correction labels 200 but also for the application of ordinary printed labels on the surfaces of common goods. Further, the positioning device F may be a detachable adapter for the label printing and applying machine. In the latter case, the positioning device F may be combined with the conventional multi-finger or rubber roller type applicators.

When the already printed labels are to be corrected, it is possible to use the smaller size labels 200 as compared with the ordinary three line labels 190. Therefore, the costs normally incurred upon using correction labels can be reduced. In addition, the selection of the indicia of the upper and middle lines need not be reprinted, reducing the chances for indicia selection errors, since the maker codes and commodity numbers printed in the upper and middle lines of three line label 190 is not covered by the correction label 200.

According to the foregoing embodiments of the present invention, the type faces of the printing head A, Aa will strike the label strip with a constant force no matter how strongly the hand lever is squeezed. In addition, the time period of contact between the type faces of the printing head and the label strip is constant, irrespective of the period of time during which the hand lever is squeezed. Therefore, clear and precise printing on the label strip can be always attained. Further, when the present invention is applied to a label printing machine for printing optically reading symbols, remarkably high quality printing can be obtained.

Although the present invention has been described in connection with preferred embodiments thereof, many variations and modifications will now become apparent to those skilled in the art. It is preferred, therefore, that the present invention be limited not by the specific disclosure herein, but only by the appended claims.

I claim:

1. A portable label printing and applying machine, comprising:

a machine frame; a platen supported by said machine frame; label moving means for moving a label onto said platen to be imprinted;

an operating lever supported by and movable with respect to said machine frame between a first and a second position;

a printing head supported by and movable with respect to said machine frame between a third and a fourth position; said printing head including printing types; at said fourth position of said printing head, said printing types being in position to engage and engaging a label on said platen and imprinting the same;

biasing means operatively connected between said operating lever and said printing head for biasing said printing head away from said third position toward said fourth position as said operating lever is operated toward said second position;

printing head restraining means connected with said printing head for restraining movement thereof toward said fourth position as said operating lever is moving toward said second position;

restraining means release means connected with said restraining means and with said operating lever for moving said restraining means to release said printing head to move to said fourth position when said operating lever has moved a predetermined distance toward said second position, said biasing means then urging said printing head toward said fourth position; at said fourth position, said printing types facing toward and engaging and imprinting a label then on said platen;

return means connected with said printing head for lifting said printing head off said fourth position and away from engagement with a label following imprinting of the label and prior to commencement of return of said operating lever toward said first position thereof.

2. The label printing and applying machine of claim 1, further comprising a yoke supported by and movable with respect to said machine frame between a fifth and a sixth position; said printing head being connected to said yoke and said printing head being moved by said yoke between said third and said fourth positions due respectively, to movement of said yoke between said fifth and said sixth positions.

3. The label printing and applying machine of claim 2, wherein said biasing means extends between said operating lever and said yoke.

4. The label printing and applying machine of claim 2, further comprising a first pivot on said machine frame; said yoke being pivotally supported on said first pivot and said yoke pivoting with respect to said machine frame around said first pivot.

5. A portable label printing and applying machine, comprising:

a machine frame; a platen supported by said machine frame; label moving means for moving a label onto said platen to be imprinted;

an operating lever supported by and movable with respect to said machine frame between a first and a second position;

a printing head supported by and movable with respect to said machine frame between a third and a fourth position; said printing head including printing types; at said fourth position of said printing head, said printing types being in position to engage and engaging a label on said platen and imprinting the same;

a yoke supported on said machine frame and being movable with respect to said machine frame between a fifth and sixth position; said printing head being connected to said yoke and said printing head being moved by said yoke between said third and said fourth positions due respectively, to movement of said yoke between said fifth and said sixth positions;

biasing means operatively connected between said operating lever and said printing head for biasing said printing head away from said third position toward said fourth position as said operating lever is operated toward said second position;

printing head restraining means engaging said yoke and blocking said yoke from moving to said sixth position for restraining movement of said printing head toward said fourth position as said operating lever is moving toward said second position;

restraining means release means comprising engaging means connected to said operating lever to move therewith and for engaging said restraining means as said operating lever moves toward said second position to separate said restraining means from said yoke for releasing said printing head to move to said fourth position when said operating lever has moved a predetermined distance toward said second position, said biasing means then urging said printing head toward said fourth position; at said fourth position, said printing types facing toward and engaging and imprinting a label then on said platen.

6. The portable label printing and applying machine of claim 5, further comprising a first pivot on said machine frame; said yoke being pivotally supported on said first pivot and said yoke pivoting with respect to said machine frame around sad first pivot.

7. The portable label printing and applying machine of claim 5, wherein said yoke includes first means connectable with said operating lever as said operating lever returns to said first position for moving said yoke to said fifth position and said printing head to said third position.

8. A portable label printing and applying machine, comprising:

a machine frame; a platen supported by said machine frame; label moving means for moving a label onto said platen to be imprinted;

an operating lever supported by and movable with respect to said machine frame between a first and a second position;

a printing head supported by and movable with respect to said machine frame between a third and a fourth position; said printing head including printing types; at said fourth position of said printing head, said printing types being in position to engage and engaging a label on said platen and imprinting the same;

said printing head comprises a first part connected with said biasing means and comprises a second part, separately movable with respect to said first part, on which said printing types are supported;

said printing head having a fifth position, intermediate its said third and said fourth positions, at which said printing types are spaced from and facing toward a label that is then on said platen;

biasing means operatively connected between said operating lever and said printing head for biasing said printing head away from said third position toward said fourth position as said operating lever is operated toward said second position;

printing head restraining means connected with said printing head for restraining movement thereof toward said fourth position as said operating lever is moving toward said second position;

said printing head restraining means engaging said first printing head part at said printing head fifth position and holding said printing head first part at said fifth position and restraining said printing head first part from moving to said fourth position;

second biasing means connected between said first and said second printing head parts and adapted to permit said second position to said fourth position, for charging said second biasing means as said second printing head part moves to said fourth position from said fifth position and for normally biasing said second printing head part to return to said fifth position;

restraining means release means connected with said restraining means and with said operating lever for moving said restraining means to release said printing head to move to said fourth position when said operating lever has moved a predetermined distance toward said second position, said biasing means then urging said printing head toward said fourth position; at said fourth position, said printing types facing toward and engaging and imprinting a label then on said platen.

9. The portable label printing and applying machine of claim 8, wherein said printing head restraining means comprises a first restraint for holding said printing head against moving to said fourth position when said operating lever is moving to said second position and comprises a second restraint for holding said printing head first part at said fifth position while said printing head second part moves to said fourth position.

10. The portable label printing and applying machine of claim 8, wherein said printing head first part comprises the casing of said printing head and said printing head second part comprises said printing types; said second biasing means joining said casing and said types and said second biasing means being so positioned as to be charged to bias said printing head second part to said fifth position when said printing head second part moves to said fourth position.

11. The label printing and applying machine of claim 8, further comprising a yoke supported by and movable with respect to said machine frame between a sixth and a seventh position; said printing head being connected to said yoke and being moved thereby between said third and said fourth positions as a result of movement of said yoke between said sixth and said seventh positions respectively;

said biasing means extending between said operating lever and said yoke.

12. The label printing and applying machine of claim 11, further comprising a first pivot on said machine frame; said yoke being pivotally supported on said first pivot and said yoke pivoting with respect to said machine frame around said first pivot between said sixth and seventh positions.

13. The label printing and applying machine of claim 12, further comprising guide means in said machine frame for said printing head for guiding said printing head to move between said third and said fourth positions as said yoke moves between said sixth and said seventh positions.

14. The label printing and applying machine of claim 12, wherein said printing head restraining means engages said yoke and blocks said yoke from pivoting to its said seventh position;

said restraining means release means comprising engaging means connected to said operating lever for being moved by said operating lever to engage said restraining means as said operating lever moves toward said second position to separate said restraining means from said yoke.

15. The label printing and applying machine of claim 14, wherein said printing head first part comprises the casing of said printing head and said printing head second part comprises said printing types; said second biasing means joining said casing and said types and said second biasing means being so positioned as to be charged when said printing head second part moves to said fourth position.

16. The label printing and applying machine of claim 14, further comprising third biasing means attached to said operating lever for returning said operating lever to said first position and for removing said engaging means from a position where said engaging means separate said printing head restraining means from said yoke.

17. The label printing and applying machine of claim 14, further comprising restraining means biasing means for normally biasing said restraining means to a position to block said printing head from moving to said fourth position.

18. The label printing and applying machine of claim 14, further comprising a second pivot on said machine frame, and said second pivot being separated from said first pivot of said yoke; said operating lever being pivotally supported on said second pivot; said operating lever pivoting with respect to said second pivot between said first position, at which said operating lever is out of a position where it separates said restraining means and said yoke, and said second position, at which said operating lever separates said restraining means and said yoke and at which said operating lever also urges said biasing means to urge said printing head toward said fourth position.

19. The label printing and applying machine of claim 18, further comprising third biasing means attached to said operating lever for returning it to said first position.

20. The label printing and applying machine of claim 14, wherein said yoke includes first means connectable with said operating lever as said operating lever returns to its said first position for moving said yoke to said sixth position and said printing head to said third position.

21. The label printing and applying machine of claim 20, wherein said yoke first means comprises a surface thereof and said operating lever is connectable with said yoke surface by abutting and pressing on said yoke surface as said operating lever moves to said first position.

22. A portable label printing and applying machine, comprising:

a machine frame; a platen supported by said machine frame; label moving means for moving a label onto said platen to be imprinted;

an operating lever supported by and movable with respect to said machine frame between a first and a second position;

a printing head supported by and movable with respect to said machine frame between a third and a fourth position; said printing head including printing types; at said fourth position of said printing head, said printing types being in position to engage and engaging a label on said platen and imprinting same;

biasing means operatively connectable to said printing head for biasing said printing head toward said fourth position;

printing head restraining means connected with said printing head for restraining movement thereof toward said fourth position under the influence of said biasing means;

connection means for operatively connecting said biasing means with said printing head and said connection means being engaged by said operating lever as said operating lever moves to said second position for overcoming the restraint upon the motion of said printing head which restraint is caused by said restraining means, whereby said biasing means biases said printing head to said fourth position;

return means connected with said printing head for lifting said printing head off said fourth position and away from engagement with a label following imprinting of the label and prior to commencement of return of said operating lever toward said first position thereof.

23. A portable label printing and applying machine, comprising:

a machine frame; a platen supported by said machine frame; label moving means for moving a label onto said platen to be imprinted;

an operating lever supported by and movable with respect to said machine frame between a first and a second position;

a printing head supported by and movable with respect to said machine frame between a third and a fourth position; said printing head including printing types; at said fourth position of said printing head, said printing types being in position to engage and engaging a label on said platen and imprinting same;

biasing means connectable with said printing head for biasing said printing head to move to fourth position;

connection means for operatively connecting said printing head and said biasing means; said connection means being engaged by said operating lever to be moved, by means of motion of said operating lever to said second position, to cause said connection means to eventually connect said printing head and said biasing means; said biasing means being so connected with said connection means that movement of said connection means to connect said printing head and said biasing means charge said biasing means to urge said printing head to said fourth position when said printing head and said biasing means are eventually connected;

disengaging means for disengaging said operating lever and said connection means upon the connection of said biasing means and said printing head by said connection means, whereby said biasing means now connected with said printing head, is freed to bias said printing head to said fourth position.

24. The label printing and applying machine of claim 23, further comprising disconnection means for disconnecting the connection of said biasing means and said printing head at about the time when said printing head is in said fourth position.

25. The portable label printing and applying machine of claim 24, further comprising printing head return means connected with said printing head for returning said printing head to its said third position after the disconnection of said printing head and said biasing means.

26. The portable label printing and applying machine of claim 25, wherein said printing head return means comprises biasing means for biasing said printing head toward said third position.

27. The portable label printing and applying machine of claim 25, further comprising a yoke pivotally mounted on said machine frame; said printing head being attached to said yoke to move therewith as said yoke pivots; said connection means engaging said yoke and connecting to said printing head through such engagement.

28. The label printing and applying machine of claim 24, wherein said connection means comprises a rocking lever mounted to rock with respect to said machine frame; said connection means further comprises a printing head engaging element carried on said rocking lever, and said rocking lever being rockable to move said engaging element from a fifth position at which said engaging element is apart from engagement with said printing head to a sixth position where said engaging element first engages said printing head and back to said fifth position with said engaging element in engagement with said printing head; said printing head being so connected with said engaging element that upon said engaging element moving said print head as said engaging element returns to said fifth position, said printing head is moved to said fourth position;

said biasing means normally biasing said engaging element to return to said fifth position thereby to move said engaging element to move said printing head to said fourth position.

29. The label printing and applying machine of claim 28, wherein said biasing means is connected to said rocking lever for biasing said rocking lever to rock to cause said engaging element to move to said fifth position.

30. The label printing and applying machine of claim 28, wherein said operating lever engages said connection means by engaging said rocking lever for rocking said rocking lever to move said engaging element to said sixth position.

31. The label printing and applying machine of claim 30, wherein said biasing means is connected to said rocking lever for biasing said rocking lever to rock to cause said engaging element to move to said fifth position.

32. The label printing and applying machine of claim 30, further comprising said disengaging means being in said machine frame for being abutted by said operating lever as said operating lever moves to said second position and for disengaging said operating lever and said rocking lever upon such abutment.

33. The label printing and applying machine of claim 28, wherein said disconnection means comprises an abutment in said machine frame positioned to be abutted by said engaging element as said engaging element is moving to and arriving at said fifth position and said engaging element and said abutment being respectively so shaped and positioned that about when said engaging element arrives at said fifth position, said abutment shifts said engaging element to disconnect from said printing head.

34. The label printing and applying machine of claim 33, further comprising second biasing means connected with said engaging element for biasing said engaging element in opposition to the motion thereof caused by engagement of said engaging element with said abutment therefor and for biasing said engaging element to engage and connect to said printing head.

35. The label printing and applying machine of claim 33, further comprising a yoke pivotally mounted on said machine frame; said printing head being attached to said yoke to move therewith as said yoke pivots; said engaging element engaging said printing head by engaging said yoke.

36. The label printing and applying machine of claim 33, wherein said operating lever has a movable link thereon in position to engage said disengaging means as said operating lever moves to said second position; *a rocking lever operating link connected between said rocking lever and said operating lever and being moved by pivotal motion of said operating lever to, in turn, rock said rocking lever,* said movable link providing the connection between said operating lever and said rocking lever operating link and said movable link being movable to disconnect said operating lever and said rocking lever operating link upon said movable link engaging said disengaging means.

37. The label printing and applying machine of claim 33, further comprising printing head return means connected with said printing head for returning said printing head to said third position after said engaging element is disconnected from said printing head.

38. The label printing and applying machine of claim 37, wherein said operating lever is pivotally mounted to said machine frame and pivots between said first and said second positions; a rocking lever operating link connected between said rocking lever and said operating lever and being moved by pivotal motion of said operating lever to, in turn, rock said rocking lever, whereby as said operating lever is pivoted to said second position, said rocking lever is rocked to move said engaging element to said sixth position.

39. The label printing and applying machine of claim 38, further comprising said disengaging means being in said machine frame for being abutted by said operating lever as said operating lever moves to said second position and for disengaging said operating lever and said rocking lever upon such abutment.

40. A portable label printing and applying machine, comprising:

a machine frame; a platen supported by said machine frame; label moving means for moving a label onto said platen to be imprinted;

an operating lever supported by and movable with respect to said machine frame between a first and a second position;

*spring means urging said operating lever toward said first position;* a printing head supported by and movable with respect to said machine frame *along a path* [between] *which includes* a third and a fourth position, said printing head including printing types; at said fourth position of said printing head, said printing types being in position to engage and engaging a label on said platen and imprinting same;

*inker means operatively mounted to said machine frame for movement across said path in operative engagement with said printing types to apply ink thereto as said operating lever moves toward said second position;*

*releasable means remote from said inker means for operatively engaging said printing head and maintaining same in said third position for restraining movement of said printing head toward said fourth position as said operating lever moves toward said second position;* biasing means for biasing said printing head toward said fourth position; said biasing means being connected to said operating lever so as to be charged for urging said printing heads to said fourth position as said operating lever moves toward said second position;

means for discharging said biasing means against said printing head after said biasing means has been charged by said operating lever, for shifting said printing head to said fourth position under the influence of the discharging said biasing means;

*said means for discharging including means operated by said operating lever to release said printing head from said releasable means as said operating lever moves toward said second position and after said biasing means has been charged by movement of said operating lever toward said second position;*

*through operation of said operating lever toward said second position, prior to release of said releasable means and subsequent to inking of said printing types, said inker means being moved to a position clear of said printing types, and*

*said inker means remaining clear of said printing types while said printing head moves from said third to said fourth position.*

41. The label printing and applying machine of claim 40 wherein [said means for discharging is connected to said operating lever for being activated as said operating lever is moving toward said second position and after said operating lever has charged said biasing means] *the printing head is maintained in said third position while said biasing means is being charged by operation of said operating lever toward said second position;*

*said printing head being moved from said third to said fourth position by force stored in said spring as said operating lever is moved from said first toward said second position; and*

*said inker means moving in only one direction across said path as said operating lever moves from said first to said second position.*

42. [The label printing and applying machine of claim 41, further comprising] *A portable label printing and applying machine, comprising:*

*a machine frame; a platen supported by said machine frame; label moving means for moving a label onto said platen to be imprinted;*

*an operating lever supported by and movable with respect to said machine frame between a first and a second position;*

*a printing head supported by and movable with respect to said machine frame between a third and a fourth position, said printing head including printing types; at said fourth position of said printing head, said printing types being in position to engage and engaging a label on said platen and imprinting same;*

*biasing means for biasing said printing head toward said fourth position; said biasing means being connected to said operating lever so as to be charged for urging said printing head to said fourth position as said operating lever moves toward said second position;*

*means for discharging said biasing means against said printing head after said biasing means has been charged by said operating lever, for shifting said printing head to said fourth position under the influence of the discharging said biasing means; said means for discharging being connected to said operating lever for being activated as said operating lever is moving toward said second position and after said operating lever has charged said biasing means;* a yoke supported by and movable with respect to said machine frame between a fifth and a sixth position; said yoke being connected to said operating lever to be moved between said fifth and said sixth positions as said operating lever is moving between said first and said second positions, respectively;

said printing head being connected to said yoke and said printing head being moved by said yoke between said third and said fourth positions due, respectively, to movement of said yoke between said fifth and said sixth positions.

43. The label printing and applying machine of claim 42, further comprising printing head restraining means connected with said printing head for restraining motion thereof toward said fourth position as said yoke moves toward said sixth position; said discharging means serving to release said restraining means after said biasing means is charged.

44. The label printing and applying machine of claim 43, wherein said printing head comprises a first part connected with said yoke to move therewith, a second part engageable by said restraining means to hold said printing head against moving to said fourth position, and a third part supporting said printing types; said first, second and third parts being relatively movable with respect to each other;

said biasing means being connected between said first and said second parts, such that as said first part continues to be moved by movement of said yoke toward said sixth position and when said restraining means holds said second part from moving along with said first part, said biasing means is charged.

45. The label printing and applying machine of claim 44, wherein said printing head has a seventh position intermediate said third and said fourth positions, at which said printing types are spaced from and face toward a label that is then on said platen;

a second restraining means in said machine for engaging said printing head second part after said discharging means has released said restraining means and said second and said third part with said second part are moved to said seventh position by said biasing means; said second restraining means holding said printing head second part at said seventh position while not restraining said printing head third part so that said third part is biased to said fourth position by the action of said biasing means on said second part before it engages said second restraining means.

46. The label printing and applying machine of claim 45, further comprising second biasing means between said second and said third printing head part for biasing said third part to return from said fourth position to said seventh position.

47. The label printing and applying machine of claim 46, wherein said restraining means comprises an arm attached to said machine frame and movable between an eighth position at which it is away from restraining said printing head second part and a ninth position at which it restrains motion of said second part toward said seventh position from said third position.

48. The label printing and applying machine of claim 47, wherein said discharging means comprises an abutment on said yoke so positioned as to engage said restraining means arm after said biasing means has been charged and upon further movement of said yoke toward said sixth position, for moving said restraining means arm to said eighth position thereof.

49. The label printing and applying machine of claim 47, wherein said restraining means further comprises an action lever pivotally connected to said machine frame and in engagement with said printing head second part, whereby said action lever pivots as said printing head second part shifts between its said positions;

an engageable element on said action lever which is engageable by said restraining means arm when it is in said ninth position, for restraining said action lever and thereby said printing head second part.

50. The label printing and applying machine of claim 49, wherein said restraining means arm is pivotally attached to said machine frame and pivots between said eighth and said ninth positions.

51. The label printing and applying machine of claim 50, wherein said engageable element on said action lever comprises an abutment thereon and said restraining means arm in its said ninth position is engaged by said abutment and blocks motion of said action lever thereby.

52. The label printing and applying machine of claim 51, wherein said discharging means comprises an abutment on said yoke so positioned as to engage said restraining means arm after said biasing means has been charged and upon further movement of said yoke toward said sixth position, for moving said restraining means arm to said eighth position thereof.

* * * * *